US012574087B2

(12) United States Patent
Lee et al.

(10) Patent No.: US 12,574,087 B2
(45) Date of Patent: Mar. 10, 2026

(54) METHOD AND APPARATUS FOR CSI CODEBOOK PARAMETERS

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/298,901

(22) Filed: Apr. 11, 2023

(65) Prior Publication Data

US 2023/0344491 A1 Oct. 26, 2023

Related U.S. Application Data

(60) Provisional application No. 63/421,043, filed on Oct. 31, 2022, provisional application No. 63/418,334, (Continued)

(51) Int. Cl.
*H04B 7/06* (2006.01)
*H04B 7/0413* (2017.01)

(52) U.S. Cl.
CPC ......... *H04B 7/0626* (2013.01); *H04B 7/0413* (2013.01)

(58) Field of Classification Search
CPC .. H04B 7/0626; H04B 7/0413; H04B 7/0482; H04B 7/048; H04B 7/0456; H04L 5/005; H04W 24/08

(Continued)

(56) References Cited

U.S. PATENT DOCUMENTS

2016/0173180 A1* 6/2016 Cheng ................. H04B 7/0417
375/267
2016/0248492 A1* 8/2016 Prasad ................... H04B 7/065
(Continued)

FOREIGN PATENT DOCUMENTS

KR 10-2018-0112796 A 10/2018
WO 2017146533 A1 8/2017
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.2.0, Jun. 2022, 250 pages.
(Continued)

*Primary Examiner* — Don N Vo

(57) ABSTRACT

Apparatuses and methods for channel state information (CSI) codebook parameters. A method performed by a user equipment (UE) includes receiving information about a channel state information (CSI) report, the information indicating N>1 CSI reference signal (CSI-RS) resources and a codebook. The codebook includes a spatial-domain (SD) basis component, a frequency-domain (FD) basis component, and a coefficient component. The SD basis component includes $L_r$ basis vectors for each CSI-RS resource $r=1, \ldots, N$. The FD basis component includes $M_v$ basis vectors. The coefficient component includes coefficients associated with (SD, FD) basis vector pairs. The information includes codebook parameters. The method further includes, based on the information, measuring the N CSI-RS resources; determining, based on the codebook parameters, the SD basis component, the FD basis component, and the coefficient component; and transmitting the CSI report.

20 Claims, 9 Drawing Sheets

Related U.S. Application Data filed on Oct. 21, 2022, provisional application No. 63/333,450, filed on Apr. 21, 2022.

(58) Field of Classification Search
USPC ........................................................ 455/101
See application file for complete search history.

(56) References Cited

U.S. PATENT DOCUMENTS

| | | | | |
|---|---|---|---|---|
| 2016/0294454 | A1* | 10/2016 | Onggosanusi | ....... H04B 7/0482 |
| 2021/0044340 | A1* | 2/2021 | Rahman | ............... H04B 7/0639 |
| 2021/0320704 | A1* | 10/2021 | Hao | ..................... H04B 7/0632 |
| 2022/0116090 | A1 | 4/2022 | Rahman et al. | |

FOREIGN PATENT DOCUMENTS

| | | |
|---|---|---|
| WO | 2022009178 A1 | 1/2022 |
| WO | 2022018672 A1 | 1/2022 |
| WO | 2022066747 A1 | 3/2022 |

OTHER PUBLICATIONS

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.2.0, Jun. 2022, 584 pages.

"LTE; Evolved Universal Terrestrial Radio Access (E-UTRA); Medium Access Control (MAC) protocol specification (3GPP TS 36.321 version 17.1.0 Release 17)", ETSI TS 136 321 V17.1.0, Aug. 2022, 147 pages.

"LTE; Evolved Universal Terrestrial Radio Access (E-UTRA); Radio Resource Control (RRC); Protocol specification (3GPP TS 36.331 version 17.1.0 Release 17)", ETSI TS 136 331 V17.1.0, Aug. 2022, 1135 pages.

"3rd Generation Partnership Project; Technical Specification Group Radio Access Network; NR; Physical channels and modulation (Release 17)", 3GPP TS 38.211 V17.2.0, Jun. 2022, 136 pages.

"3rd Generation Partnership Project; Technical Specification Group Radio Access Network; NR; Multiplexing and channel coding (Release 17)", 3GPP TS 38.212 V17.2.0, Jun. 2022, 201 pages.

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

5G; NR; Physical layer measurements (3GPP TS 38.215 version 17.1.0 Release 17), ETSI TS 138 215 V17.1.0, Apr. 2022, 32 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

International Search Report and Written Opinion issued Jul. 31, 2023 regarding International Application No. PCT/KR2023/005171, 7 pages.

Vivo, "Maintenance on MTRP CSI and partial reciprocity", 3GPP TSG RAN WG1 #108-e, R1-2201084, Feb. 2022, 16 pages.

Extended European Search Report issued May 27, 2025 regarding Application No. 23792127.5, 12 pages.

* cited by examiner

500

600

700

Port layout in a panel $N_2$-1  ✕ ✕ ✕ ✕    ✕

⋮

2$^{nd}$ dim.    ✕ ✕ ✕ ✕ ⋯ ✕
               ✕ ✕ ✕ ✕    ✕
         0 ✕ ✕ ✕ ✕    ✕
           0                $N_1$-1
              1$^{st}$ dim.

Single panel                          Multi-panel $Ng = 1$          $Ng = 2$                $Ng = 4$

800

3D grid of beams in
(1st port dim., 2nd port dim., freq. dim.)

$O_3 N_3$-1

Frequency dim.

2nd port dim.

$O_2 N_2$-1

Frequency dim.

$O_1 N_1$-1

1st port dim.

1000

Receive information about a CSI report. ~ 1010

Measure *N* CSI-RS resources. ~ 1020

Determine a SD basis component, a FD basis component, and a coefficient component. ~ 1030

Transmit the CSI report. ~ 1040

METHOD AND APPARATUS FOR CSI CODEBOOK PARAMETERS

CROSS-REFERENCE TO RELATED APPLICATION AND CLAIM OF PRIORITY

This application claims priority under 35 U.S.C. § 119(e) to U.S. Provisional Patent Application No. 63/333,450 filed on Apr. 21, 2022, U.S. Provisional Patent Application No. 63/418,334 filed on Oct. 21, 2022, and U.S. Provisional Patent Application No. 63/421,043 filed on Oct. 31, 2022. The above-identified provisional patent applications are hereby incorporated by reference in their entirety.

TECHNICAL FIELD

The present disclosure relates generally to wireless communication systems and, more specifically, to electronic devices and methods on codebook parameter configurations for multiple-input multiple-output (MIMO) operations, more particularly, to electronic devices and methods on codebook parameter configurations for distributed MIMO or multi-transmission reception point (TRP) operations in wireless networks.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for CSI codebook parameters.

In one embodiment, a user equipment (UE) is provided. The UE includes a transceiver configured to receive information about a channel state information (CSI) report. The information indicates N>1 CSI reference signal (CSI-RS) resources and a codebook. The codebook includes a spatial-domain (SD) basis component, a frequency-domain (FD) basis component, and a coefficient component. The SD basis component includes $L_r$ basis vectors for each CSI-RS resource r=1, . . . , N. The FD basis component includes $M_v$ basis vectors. The coefficient component includes coefficients associated with (SD, FD) basis vector pairs. The information includes codebook parameters. The codebook parameters include $$p_v = \begin{cases} \dfrac{1}{8} & \text{for } v = 1, 2 \\ \dfrac{1}{16} & \text{for } v = 3, 4 \end{cases}, (L_1, L_2, \ldots, L_N),$$

and $\beta$ where $p_v$ is a parameter to determine a value of M based on a total number of precoding matrices $N_3$, v is a number of layers, and $\beta \leq 1$ is a parameter to determine an upper bound $K_0$ of a number of non-zero coefficients of the coefficient component. The UE further includes a processor operably coupled to the transceiver. The processor, based on the information, is configured to measure the N CSI-RS resources and determine, based on the codebook parameters, the SD basis component, the FD basis component, and the coefficient component. The transceiver is further configured to transmit the CSI report.

In another embodiment, a base station (BS) is provided. The BS includes a processor configured to identify information about a CSI report. The information indicates N>1 CSI-RS resources and a codebook. The codebook includes a SD basis component, a FD basis component, and a coefficient component. The SD basis component includes $L_r$ basis vectors for each CSI-RS resource r=1, . . . , N. The FD basis component includes $M_v$ basis vectors. The coefficient component includes coefficients associated with (SD, FD) basis vector pairs. The information includes codebook parameters. The codebook parameters include $$p_v = \begin{cases} \dfrac{1}{8} & \text{for } v = 1, 2 \\ \dfrac{1}{16} & \text{for } v = 3, 4 \end{cases}, (L_1, L_2, \ldots, L_N),$$

and $\beta$. The BS further includes a transceiver operably coupled to the processor. The transceiver is configured to transmit the information about the CSI report and receive the CSI report.

In yet another embodiment, a method performed by a UE is provided. The method includes receiving information about a CSI report. The information indicates N>1 CSI-RS resources and a codebook. The codebook includes a SD basis component, a FD basis component, and a coefficient component. The SD basis component includes $L_r$ basis vectors for each CSI-RS resource r=1, . . . , N. The FD basis component includes $M_v$ basis vectors. The coefficient component includes coefficients associated with (SD, FD) basis vector pairs. The information includes codebook parameters. The codebook parameters include $$p_v = \begin{cases} \dfrac{1}{8} & \text{for } v = 1, 2 \\ \dfrac{1}{16} & \text{for } v = 3, 4 \end{cases}, (L_1, L_2, \ldots, L_N),$$

and $\beta$. The method further includes, based on the information, measuring the N CSI-RS resources; determining, based on the codebook parameters, the SD basis component, the FD basis component, and the coefficient component; and transmitting the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
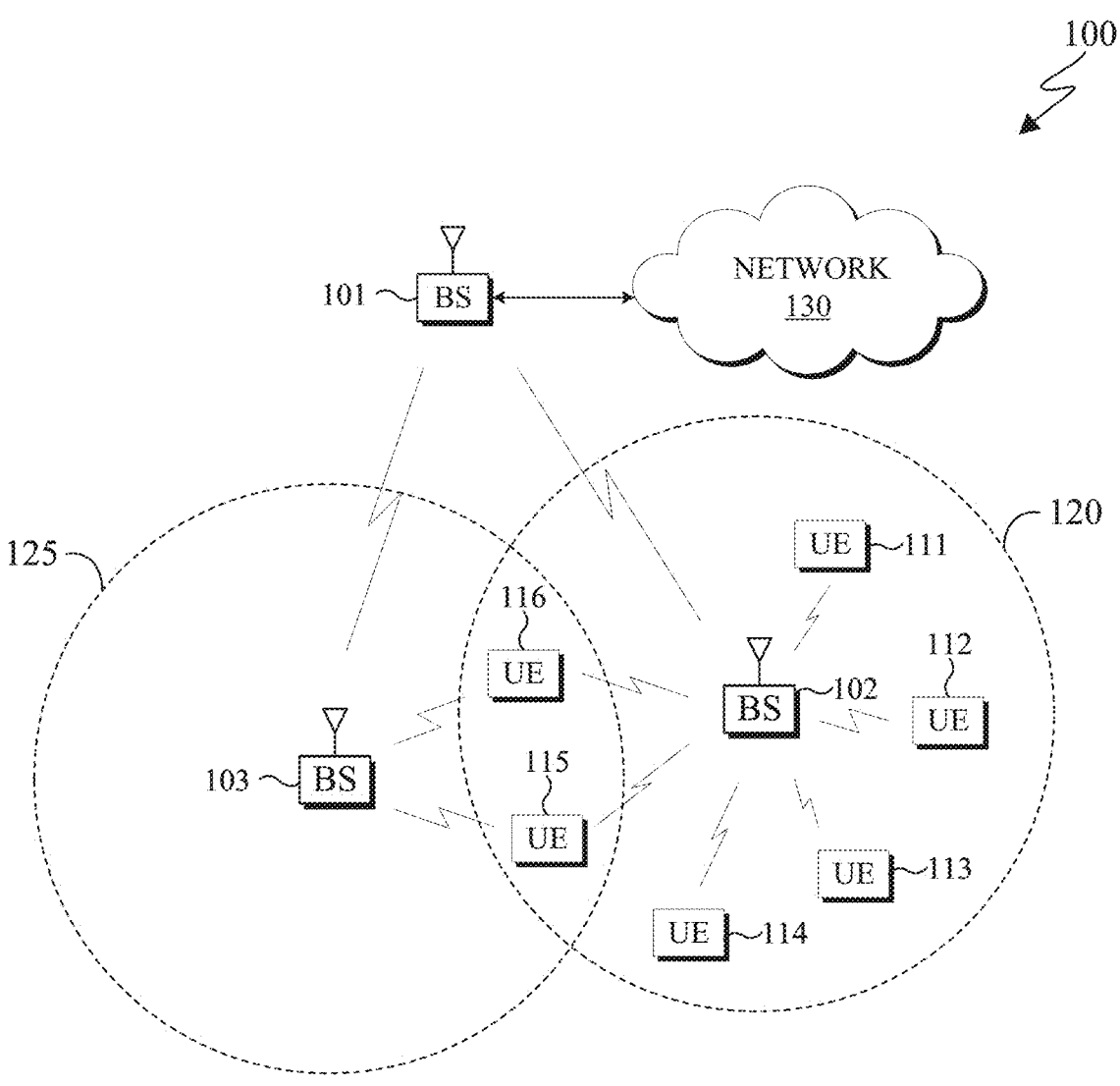
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.2.0, "E-UTRA, Physical channels and modulation" (herein "REF 1"); 3GPP TS 36.212 v17.2.0, "E-UTRA, Multiplexing and Channel coding" (herein "REF 2"); 3GPP TS 36.213 v17.2.0, "E-UTRA, Physical Layer Procedures" (herein "REF 3"); 3GPP TS 36.321 v17.1.0, "E-UTRA, Medium Access Control (MAC) protocol specification" (herein "REF 4"); 3GPP TS 36.331 v17.1.0, "E-UTRA, Radio Resource Control (RRC) Protocol Specification" (herein "REF 5"); 3GPP TS 38.211 v17.2.0, "NR, Physical channels and modulation" (herein "REF 6"); 3GPP TS 38.212 v17.2.0, "NR, Multiplexing and Channel coding" (herein "REF 7"); 3GPP TS 38.213 v17.2.0, "NR, Physical Layer Procedures for Control" (herein "REF 8"); 3GPP TS 38.214 v17.2.0, "NR, Physical Layer Procedures for Data" (herein "REF 9"); 3GPP TS 38.215 v17.1.0, "NR, Physical Layer Measurements" (herein "REF 10"); 3GPP TS 38.321 v17.1.0, "NR, Medium Access Control (MAC) protocol specification" (herein "REF 11"); 3GPP TS 38.331 v17.1.0, "NR, Radio Resource Control (RRC) Protocol Specification" (herein "REF 12").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
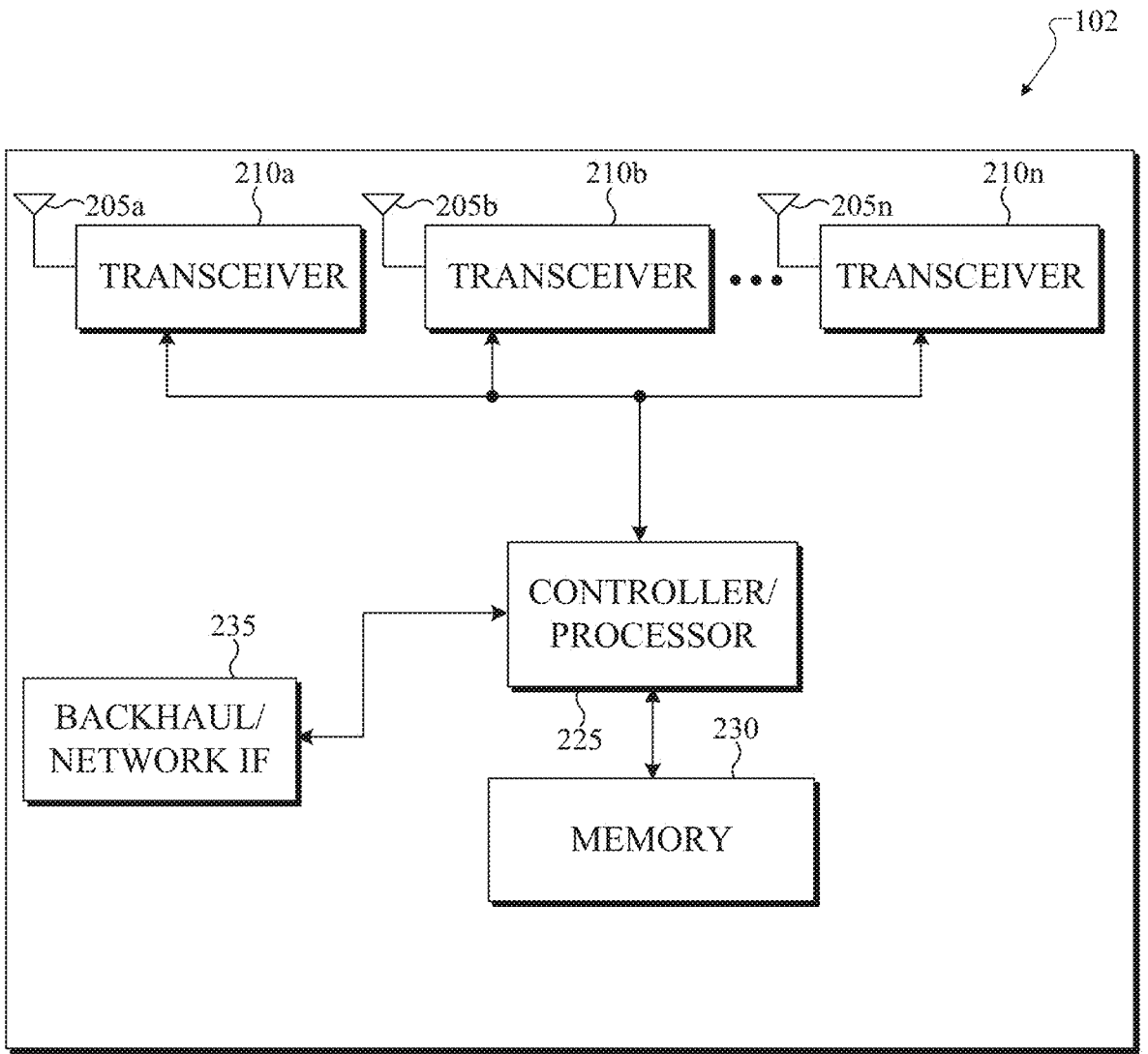
FIG. 2 illustrates an example gNodeB (gNB) according to embodiments of the present disclosure.
Figure 3:
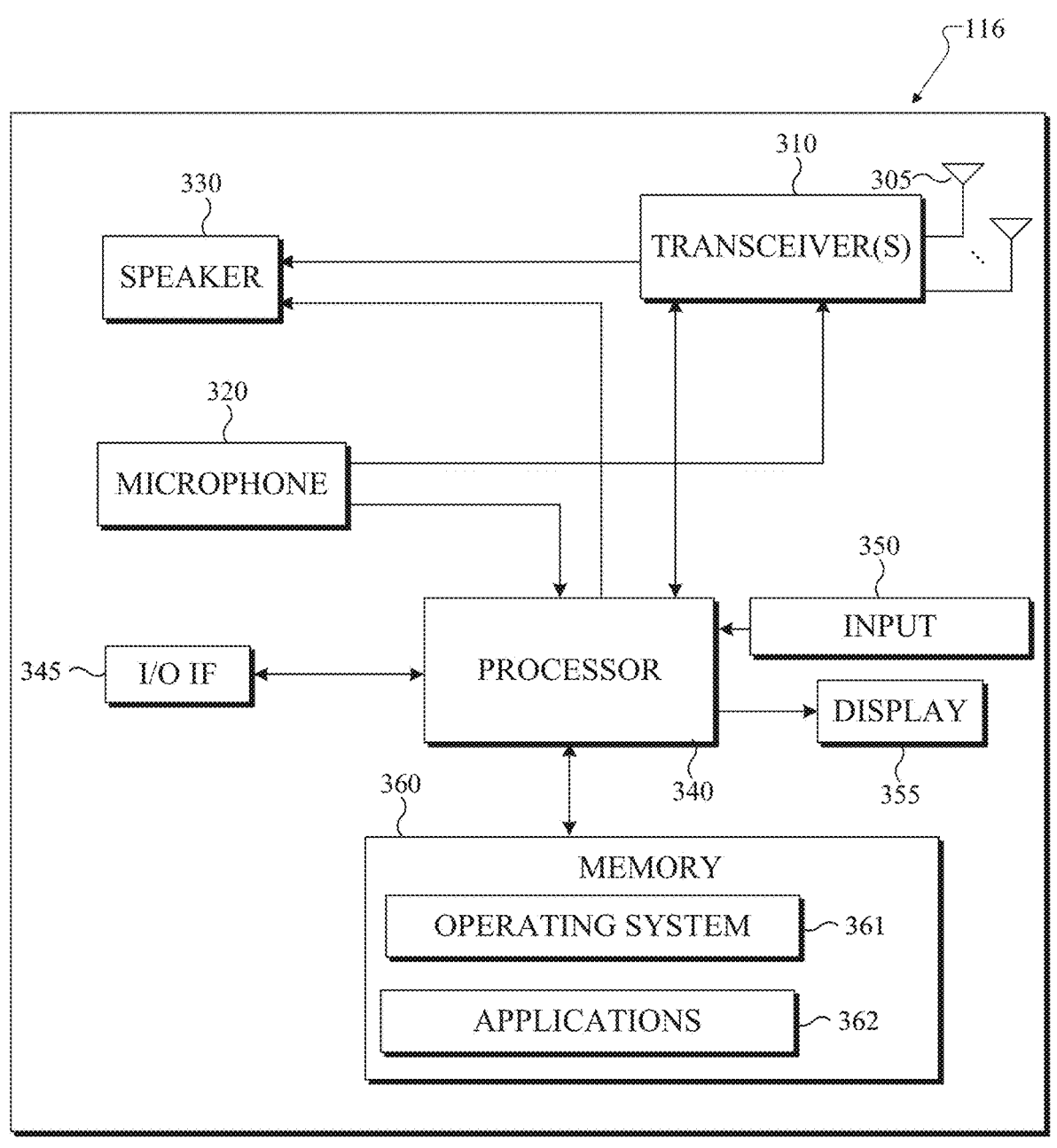
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting CSI codebook parameters. In certain embodiments, one or more of the BS s 101-103 include circuitry, programing, or a combination thereof for supporting CSI codebook parameters.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting CSI codebook parameters. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 4:
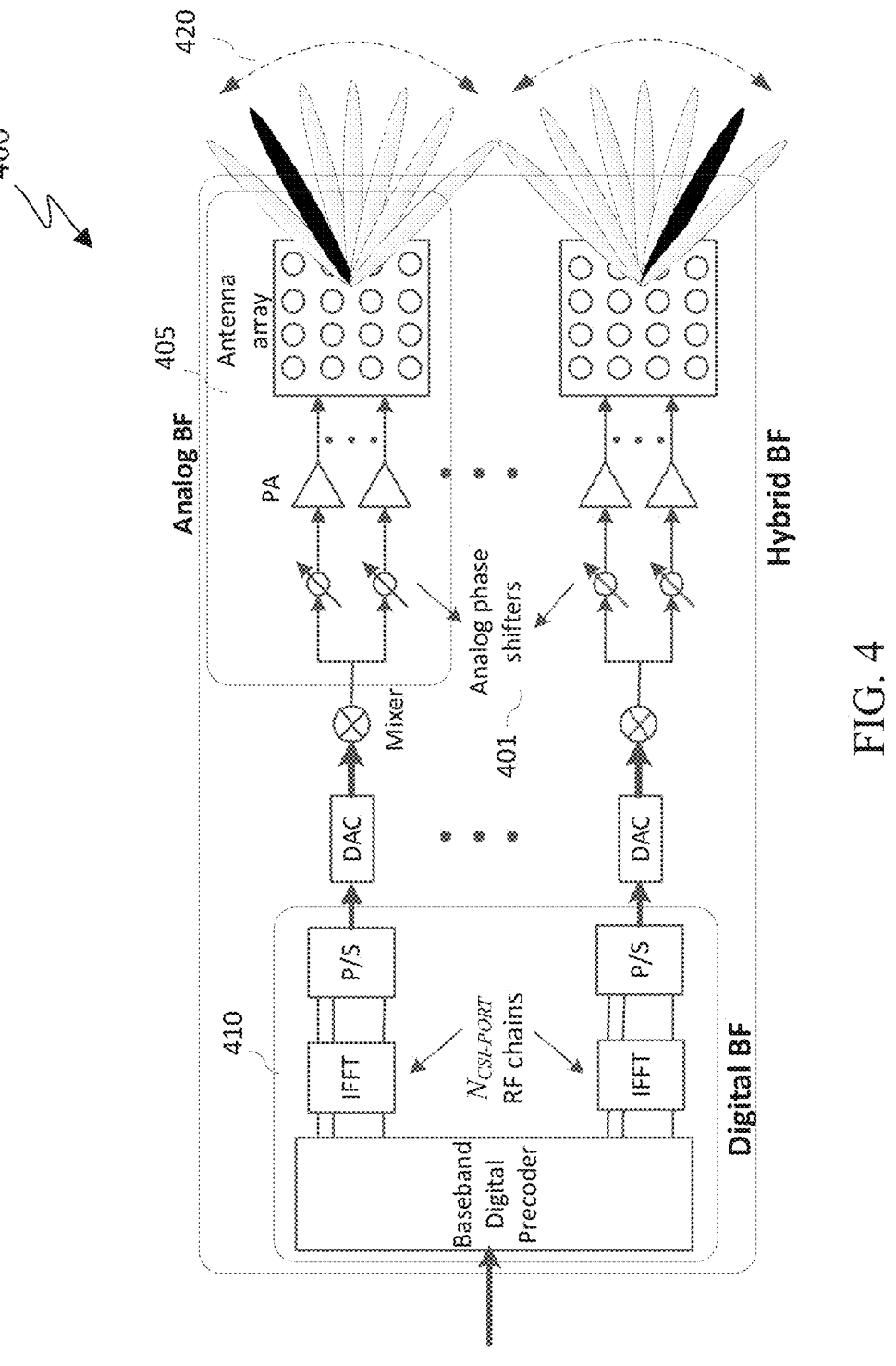
FIG. 4 illustrates an example antenna blocks or arrays forming beams according to embodiments of the present disclosure.

FIG. 4 illustrates an example antenna blocks or arrays 400 according to embodiments of the present disclosure. The embodiment of the antenna blocks or arrays 400 illustrated in FIG. 4 is for illustration only. FIG. 4 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes. The number of sub-arrays (equal to the number of RF chains) is the same as the number of CSI-RS ports NCSI-PORT A digital beamforming unit 410 performs a linear combination across NCSI-PORT analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100 m distance), larger number of and sharper analog beams (hence larger number of radiators in the array) will be needed to compensate for the additional path loss.

At lower frequency bands such as <1 GHz, on the other hand, the number of antenna elements may not be large in a given form factor due to the large wavelength. As an example, for the case of the wavelength size (λ) of the center frequency 600 MHz (which is 50 cm), it desires 4 m for uniform-linear-array (ULA) antenna panel of 16 antenna elements with the half-wavelength distance between two adjacent antenna elements. Considering a plurality of antenna elements is mapped to one digital port in practical cases, the desirable size for antenna panel(s) at gNB to support a large number of antenna ports such as 32 CSI-RS ports becomes very large in such low frequency bands, and it leads the difficulty of deploying 2-D antenna element arrays within the size of a conventional form factor. This results in a limited number of CSI-RS ports that can be supported at a single site and limits the spectral efficiency of such systems.

Various embodiments of the present disclosure recognize that for a cellular system operating in a sub-1 GHz frequency range (e.g., less than 1 GHz), supporting large number of CSI-RS antenna ports (e.g., 32) at a single location or remote radio head (RRH) or TRP is challenging due to that a larger antenna form factor size is needed at these frequencies than a system operating at a higher frequency such as 2 GHz or 4 GHz. At such low frequencies, the maximum number of CSI-RS antenna ports that can be co-located at a single site (or TRP/RRH) can be limited, for example to 8. This limits the spectral efficiency of such systems. In particular, the MU-MIMO spatial multiplexing gains offered due to large number of CSI-RS antenna ports (such as 32) can't be achieved.

One way to operate a sub-1 GHz system with a large number of CSI-RS antenna ports is based on distributing antenna ports at multiple locations (or TRP/RRHs). The multiple sites or TRPs/RRHs can still be connected to a single (common) base unit, hence the signal transmitted/received via multiple distributed TRPs/RRHs can still be processed at a centralized location. This is called distributed MIMO or multi-TRP coherent joint transmission (C-JT).

Accordingly, various embodiments of the present disclosure consider the multi-TRP C-JT scenario and propose methods and apparatus for codebook parameters considering feedback overhead in the scenario.

Various embodiments of the present disclosure recognize that CSI enhancement described in Rel-18 MIMO considers Rel-16/17 Type-II CSI codebook refinements to support mTRP coherent joint transmission (C-JT) operations by considering performance-and-overhead trade-off. The Rel-16/17 Type-II CSI codebook has three components $W_1$, $W_2$, and $W_f$. Among them, $W_2$ is the component that could induce large CSI feedback overhead especially in mTRP C-JT operations.

Accordingly, various embodiments of the present disclosure provide codebook parameter configurations to alleviate the amount of CSI reporting overhead to have good performance-and-overhead trade-off for C-JT operations. The codebook parameter configurations (an extension of the tables of paraCombination-r16, paraCombination-r17) are proposed to have good performance-and-overhead trade-off for mTRP C-JT operations.

Figure 5:
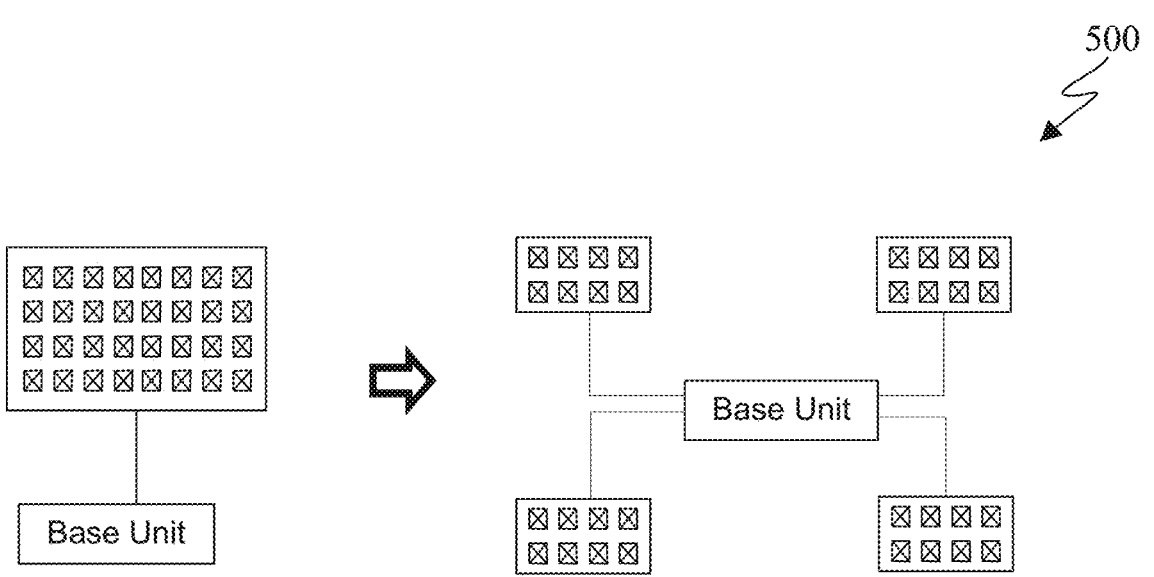
FIG. 5 illustrates an example distributed multiple-input multiple-output (MIMO) system according to embodiments of the present disclosure.

FIG. 5 illustrates an example distributed MIMO system 500 according to embodiments of the present disclosure. The embodiment of the distributed MIMO system 500 illustrated in FIG. 5 is for illustration only. FIG. 5 does not limit the scope of this disclosure to any particular implementation of the distributed MIMO system 500.

One possible approach to resolving the issue is to form multiple TRPs (multi-TRP) or RRHs with a small number of antenna ports instead of integrating all of the antenna ports in a single panel (or at a single site) and to distribute the multiple panels in multiple locations/sites (or TRPs, RRHs). This approach is shown in FIG. 5.

Figure 6:
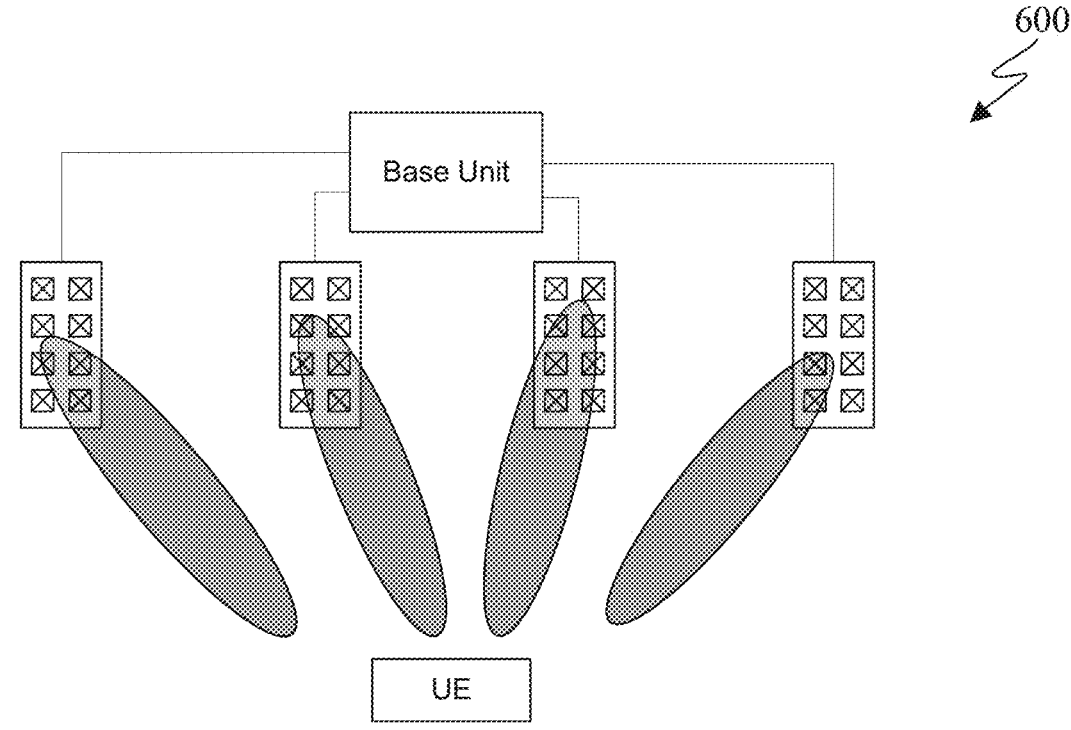
FIG. 6 illustrates an example distributed MIMO system according to embodiments of the present disclosure.

FIG. 6 illustrates an example distributed MIMO system 600 according to embodiments of the present disclosure. The embodiment of the distributed MIMO system 600 illustrated in FIG. 6 is for illustration only. FIG. 6 does not limit the scope of this disclosure to any particular implementation of the distributed MIMO system 600.

As illustrated in FIG. 6, the multiple TRPs at multiple locations can still be connected to a single base unit, and thus the signal transmitted/received via multiple distributed TRPs can be processed in a centralized manner through the single base unit.

Note that although the present disclosure has mentioned low frequency band systems (sub-1 GHz band) as a motivation for distributed MIMO (or mTRP), the distributed MIMO technology is frequency-band-agnostic and can be useful in mid-(sub-6 GHz) and high-band (above-6 GHz) systems in addition to low-band (sub-1 GHz) systems.

The terminology "distributed MIMO" is used as an illustrative purpose, it can be considered under another terminology such as multi-TRP, mTRP, cell-free network, and so on.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 7:
FIG. 7 illustrates an example antenna port layout according to embodiments of the present disclosure.

FIG. 7 illustrates an example antenna port layout 700 according to embodiments of the present disclosure. The embodiment of the antenna port layout 700 illustrated in FIG. 13 is for illustration only. FIG. 7 does not limit the scope of this disclosure to any particular implementation of the antenna port layout.

As illustrated in FIG. 7, $N_1$ and $N_2$ are the number of antenna ports with the same polarization in the first and second dimensions, respectively. For 2D antenna port layouts, $N_1 > 1$, $N_2 > 1$, and for 1D antenna port layouts $N_1 > 1$ and $N_2 = 1$. Therefore, for a dual-polarized antenna port layout, the total number of antenna ports is $2N_1N_2$ when each antenna maps to an antenna port. An illustration is shown in FIG. 7 where "X" represents two antenna polarizations. In this disclosure, the term "polarization" refers to a group of antenna ports. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-RS antenna ports and X is a starting antenna port number (e.g., X=3000, then antenna ports are 3000, 3001, 3002, . . . ). Let $N_g$ be a number of antenna panels at the gNB. When there are multiple antenna panels ($N_g > 1$), we assume that each panel is dual-polarized antenna ports with $N_1$ and $N_2$ ports in two dimensions. This is illustrated in FIG. 7. Note that the antenna port layouts may or may not be the same in different antenna panels.

In one example, the antenna architecture of a D-MIMO or CJT (coherent joint-transmission) system is structured. For example, the antenna structure at each RRH (or TRP) is dual-polarized (single or multi-panel as shown in FIG. 7. The antenna structure at each RRH/TRP can be the same. Alternatively, the antenna structure at an RRH/TRP can be different from another RRH/TRP. Likewise, the number of ports at each RRH/TRP can be the same. Alternatively, the number of ports at one RRH/TRP can be different from another RRH/TRP. In one example, $N_g = N_{RRH}$, a number of RRHs/TRPs in the D-MIMO transmission.

In another example, the antenna architecture of a D-MIMO or CJT system is unstructured. For example, the antenna structure at one RRH/TRP can be different from another RRH/TRP.

We assume a structured antenna architecture in the rest of the disclosure. For simplicity, we assume each RRH/TRP is equivalent to a panel, although, an RRH/TRP can have multiple panels in practice. The disclosure however is not restrictive to a single panel assumption at each RRH/TRP, and can easily be extended (covers) the case when an RRH/TRP has multiple antenna panels.

In one embodiment, an RRH constitutes (or corresponds to or is equivalent to) at least one of the following:

In one example, an RRH corresponds to a TRP.

In one example, an RRH or TRP corresponds to a CSI-RS resource. A UE is configured with $K=N_{RRH}>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an RRH or TRP corresponds to a CSI-RS resource group, where a group comprises one or multiple NZP CSI-RS resources. A UE is configured with $K \geq N_{RRH}>1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example, an RRH or TRP corresponds to one or more examples described above depending on a configuration. For example, this configuration can be explicit via a parameter (e.g., an RRC parameter). Alternatively, it can be implicit.

In one example, when implicit, it could be based on the value of K. For example, when K>1 CSI-RS resources, an RRH corresponds to one or more examples described above, and when K=1 CSI-RS resource, an RRH corresponds to one or more examples described above.

In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across TRPs/RRHs).

In one example, when RRH or TRP maps (or corresponds to) a CSI-RS resource or resource group, and a UE can select a subset of RRHs (resources or resource groups) and report the CSI for the selected TRPs/RRHs (resources or resource groups), the selected TRPs/RRHs can be reported via an indicator. For example, the indicator can be a CRI or a PMI (component) or a new indicator.

In one example, when RRH or TRP maps (or corresponds to) a CSI-RS port group, and a UE can select a subset of TRPs/RRHs (port groups) and report the CSI for the selected TRPs/RRHs (port groups), the selected TRPs/RRHs can be reported via an indicator. For example, the indicator can be a CRI or a PMI (component) or a new indicator.

In one example, when multiple (K>1) CSI-RS resources are configured for $N_{RRH}$ TRPs/RRHs, a decoupled (modular) codebook is used/configured, and when a single (K=1) CSI-RS resource for $N_{RRH}$ TRPs/RRHs, a joint codebook is used/configured.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 8:
FIG. 8 illustrates a 3D grid of oversampled discrete Fourier transform (DFT) beams according to embodiments of the present disclosure.

FIG. 8 illustrates a 3D grid of oversampled DFT beams 800 according to embodiments of the present disclosure. The embodiment of the 3D grid of oversampled DFT beams 800 illustrated in FIG. 8 is for illustration only. FIG. 8 does not limit the scope of this disclosure to any particular implementation of the 3D grid of oversampled DFT beams.

As illustrated, FIG. 8 shows a 3D grid 800 of the oversampled DFT beams (1st port dim., 2nd port dim., freq. dim.) in which:

a 1st dimension is associated with the 1st port dimension, a 2nd dimension is associated with the 2nd port dimension, and a 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_i$ belongs to {2, 4, 8}. In yet another example, at least one of $O_1$, $O_2$, and $O_3$ is higher layer configured (via RRC signaling).

As explained in Section 5.2.2.2.6 of REFS, a UE is configured with higher layer parameter codebookType set to ' typeII-PortSelection-r16' for an enhanced Type II CSI reporting in which the pre-coders for all SBs and for a given layer l=1, . . . , v, where v is the associated RI value, is given by either $$W^l = AC_l B^H = [a_0\, a_1\, \dots\, a_{L-1}] \qquad \text{(Eq. 1)}$$

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \dots b_{M-1}]^H =$$

$$\sum_{f=0}^{M-1}\sum_{i=0}^{L-1} c_{l,i,f}\left(a_i b_f^H\right) = \sum_{i=0}^{L-1}\sum_{f=0}^{M-1} c_{l,i,f}\left(a_i b_f^H\right),$$

or

-continued $$W^l = \begin{bmatrix} A & 0 \\ 0 & A \end{bmatrix} C_l B^H = \begin{bmatrix} a_0\, a_1 \dots a_{L-1} & 0 \\ 0 & a_0\, a_1 \dots a_{L-1} \end{bmatrix} \quad \text{(Eq. 2)}$$

$$\begin{bmatrix} c_{l,0,0} & c_{l,0,1} & \dots & c_{l,0,M-1} \\ c_{l,1,0} & c_{l,1,1} & \dots & c_{l,1,M-1} \\ \vdots & \vdots & \vdots & \vdots \\ c_{l,L-1,0} & c_{l,L-1,1} & \dots & c_{l,L-1,M-1} \end{bmatrix} [b_0\, b_1\, \dots\, b_{M-1}]^H =$$

$$\begin{bmatrix} \sum_{f=0}^{M-1} \sum_{i=0}^{L-1} c_{l,i,f}\left(a_i b_f^H\right) \\ \sum_{f=0}^{M-1} \sum_{i=0}^{L-1} c_{l,i+L,f}\left(a_i b_f^H\right) \end{bmatrix},$$

where:

$N_1$ is a number of antenna ports in a first antenna port dimension (having the same antenna polarization), $N_2$ is a number of antenna ports in a second antenna port dimension (having the same antenna polarization), $P_{CSI\text{-}RS}$ is a number of CSI-RS ports configured to the UE, $N_3$ is a number of SBs for PMI reporting or number of FD units or number of FD components (that comprise the CSI reporting band) or a total number of precoding matrices indicated by the PMI (one for each FD unit/component), $\alpha_1$ is a $2N_1N_2\times1$ (Eq. 1) or $N_1N_2\times1$ (Eq. 2) column vector, or $\alpha_i$ is a $$P_{CSIRS}\times 1 \text{ or } \frac{P_{CSIRS}}{2}\times 1 \quad \text{(Eq. 1)}$$

port selection column vector, where a port selection vector is a defined as a vector which contains a value of 1 in one element and zeros elsewhere, $b_f$ is a $N_3\times1$ column vector, $c_{l,i,f}$ is a complex coefficient.

In a variation, when the UE reports a subset $K<2LM$ coefficients (where K is either fixed, configured by the gNB or reported by the UE), then the coefficient $c_{l,i,f}$ in precoder equations Eq. 1 or Eq. 2 is replaced with $x_{l,i,f}\times c_{l,i,f}$, where:

$x_{l,i,f}=1$ if the coefficient $c_{l,i,f}$ is reported by the UE according to some embodiments of this disclosure.

$x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1}\sum_{f=0}^{M_i-1} c_{l,i,f}\left(a_i b_{i,f}^H\right) \quad \text{(Eq. 3)}$$

and $$W^l = \begin{bmatrix} \sum_{i=0}^{L-1}\sum_{f=0}^{M_i-1} c_{l,i,f}\left(a_i b_{i,f}^H\right) \\ \sum_{i=0}^{L-1}\sum_{f=0}^{M_i-1} c_{l,i+L,f}\left(a_i b_{i,f}^H\right) \end{bmatrix}, \quad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i\leq M$ (where $\{M_i\}$ or $\Sigma M_i$ is either fixed, configured by the gNB or reported by the UE).

The columns of $W^1$ are normalized to norm one. For rank R or R layers ($\upsilon=R$), the pre-coding matrix is given by $$L \leq \frac{P_{CSI\text{-}RS}}{2} \text{ and } M \leq N_3. \text{ If } L = \frac{P_{CSI\text{-}RS}}{2},$$

Eq. 2 is assumed in the rest of the disclosure. The embodiments of the disclosure, however, are general and are also application to Eq. 1, Eq. 3, and Eq. 4.

Here $$W^{(R)} = \frac{1}{\sqrt{R}}\left[W^1 \quad W^2 \quad \dots \quad W^R\right].$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \left[1 \quad e^{j\frac{2\pi n_{3,l}^{(f)}}{O_3 N_3}} \quad e^{j\frac{2\pi\cdot 2 n_{3,l}^{(f)}}{O_3 N_3}} \quad \dots \quad e^{j\frac{2\pi\cdot(N_3-1) n_{3,l}^{(f)}}{O_3 N_3}}\right]^T.$$

When $O_3=1$, the FD basis vector for layer $l\in\{1, \dots, \upsilon\}$ (where v is the RI or rank value) is given by:

$$w_f = \left[y_{0,l}^{(f)} \quad y_{1,l}^{(f)} \quad \dots \quad y_{N_3-1,l}^{(f)}\right]^T,$$

where $$y_{t,l}^{(f)} = e^{j\frac{2\pi t n_{3,l}^{(f)}}{N_3}} \text{ and } n_{3,l} = \left[n_{3,l}^{(0)}, \dots, n_{3,l}^{(M-1)}\right]$$

where $$n_{3,l}^{(f)} \in \{0, 1, \dots, N_3-1\}.$$

In another example, discrete cosine transform DCT basis is used to construct/report basis B for the $3^{rd}$ dimension. The m-th column of the DCT compression matrix is simply given by:

$$[w_f]_{nm} = \begin{cases} \dfrac{1}{\sqrt{K}}, & n = 0 \\ \sqrt{\dfrac{2}{K}}\cos\dfrac{\pi(2m+1)n}{2K}, & n = 1, \dots K-1 \end{cases}, \text{ and}$$

$$K = N_3, \text{ and } m = 0, \dots, N_3-1.$$

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purposes only. The disclosure is applicable to any other basis vectors to construct/report A and B.

On a high level, a precoder $W^l$ can be described as follows.

$$W = A_l C_l B_l^H = W_1 \tilde{W}_2 W_f^H, \quad \text{(Eq. 5)}$$

where $A=W_1$ corresponds to the Rel. 15 $W_1$ in Type II CSI codebook [REFS], and $B=W_f$.

The $C_l = \tilde{W}_2$ matrix consists of all the required linear combination coefficients (e.g., amplitude and phase or real or imaginary). Each reported coefficient ($c_{l,i,f} = p_{l,i,f} \phi_{l,i,f}$) in $W_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to $\{2, 3, 4\}$. If multiple values for A are supported, then one value is configured via higher layer signaling. In another example, the amplitude coefficient ($P_{l,i,f}$) is reported as $P_{l,i,f} = p_{l,i,f}^{(1)} p_{l,i,f}^{(2)}$ where:

$p_{l,i,f}^{(1)}$ is a reference or first amplitude which is reported using an A1-bit amplitude codebook where A1 belongs to $\{2, 3, 4\}$, and $p_{l,i,f}^{(2)}$ is a differential or second amplitude which is reported using a A2-bit amplitude codebook where A2≤A1 belongs to $\{2, 3, 4\}$.

For layer 1, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ A X-bit indicator for the strongest coefficient index ($i^*$, $f^*$), where $X = \lceil \log_2 K_{NZ} \rceil$ or $\lceil \log_2 2L \rceil$.

i. Strongest coefficient $c_{l,i^*,f^*} = 1$ (hence its amplitude/phase are not reported)

Two antenna polarization-specific reference amplitudes is used.

i. For the polarization associated with the strongest coefficient $c_{l,i^*,f^*} = 1$, since the reference amplitude $p_{l,i,f}^{(1)} = 1$, it is not reported ii. For the other polarization, reference amplitude $p_{l,i,f}^{(2)}$ is quantized to 4 bits.

1. The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}} \right\}.$$

For $\{c_{l,i,f}, (i,f) \neq (i^*, f^*)\}$:

i. For each polarization, differential amplitudes $p_{l,i,f}^{(2)}$ of the coefficients calculated relative to the associated polarization-specific reference amplitude and quantized to 3 bits.

1. The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

2. Note: The final quantized amplitude $p_{l,i,f}$ is given by $p_{l,i,f}^{(1)} \times p_{l,i,f}^{(2)}$ ii. Each phase is quantized to either 8 PSK ($N_{ph} = 8$) or 16 PSK ($N_{ph} = 16$) (which is configurable).

For the polarization $r^* \in \{0,1\}$ associated with the strongest coefficient $c_{l,i^*,f^*}$, we have $$r^* = \left\lfloor \frac{i^*}{L} \right\rfloor$$

and the reference amplitude $p_{l,i,f}^{(1)} = p_{l,r}^{(1)} = 1$. For the other polarization $r \in \{0,1\}$ and $r \neq r^*$, we have $$r = \left( \left\lfloor \frac{i^*}{L} \right\rfloor + 1 \right) \bmod 2$$

and the reference amplitude $p_{l,i,f}^{(1)} = p_{l,r}^{(1)}$ is quantized (reported) using the 4-bit amplitude codebook mentioned above.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from $\{1,2\}$ and p is higher-layer configured from $\{\frac{1}{4}, \frac{1}{2}\}$. In one example, the p value is higher-layer configured for rank 1-2 CSI reporting. For rank>2 (e.g., rank 3-4), the p value (denoted by $v_0$) can be different. In one example, for rank 1-4, ($p$, $v_0$) is jointly configured from $$\left\{ \left(\frac{1}{2}, \frac{1}{4}\right), \left(\frac{1}{4}, \frac{1}{4}\right), \left(\frac{1}{4}, \frac{1}{8}\right) \right\}, \text{ i.e., } M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting. In one example, M is replaced with $M_v$ to show its dependence on the rank value $v$, hence p is replaced with $p_v, v \in \{1,2\}$ and $v_0$ is replaced with $p_v, v \in \{3,4\}$.

A UE can be configured to report $M_v$ FD basis vectors in one-step from $N_3$ basis vectors freely (independently) for each layer $l \in \{1, \ldots, v\}$ of a rank $v$ CSI reporting. Alternatively, a UE can be configured to report $M_v$ FD basis vectors in two-step as follows.

In step 1, an intermediate set (InS) comprising $M_3' < N_3$ basis vectors is selected/reported, wherein the InS is common for all layers.

In step 2, for each layer $l \in \{1, \ldots, v\}$ of a rank $v$ CSI reporting, $M_v$ FD basis vectors are selected/reported freely (independently) from $N_3'$ basis vectors in the InS.

In one example, one-step method is used when $N_3 \leq 19$ and two-step method is used when $N_3 > 19$. In one example, $N_3' = \lceil \alpha M_v \rceil$ where $\alpha > 1$ is either fixed (to 2 for example) or configurable.

The codebook parameters used in the DFT based frequency domain compression (Eq. 5) are (L, $p_v$ for $v \in \{1,2\}$, $p_v$ for $v \in \{3,4\}$, $\beta$, $\alpha$, $N_{ph}$). The set of values for these codebook parameters are as follows.

L: the set of values is {2,4} in general, except L∈{2,4,6} for rank 1-2, 32 CSI-RS antenna ports, and R=1.

$(p_\upsilon$ for $\upsilon \in \{1,2\}$, $p_\upsilon$ for $\upsilon \in \{(\frac{1}{2},\frac{1}{4}),(\frac{1}{4},\frac{1}{4}),(\frac{1}{4},\frac{1}{8})\}$ $\beta \in \{\frac{1}{2},\frac{1}{2},\frac{3}{4}\}$.

$\alpha=2$ $N_{ph}=16$.

The set of values for these codebook parameters are as in Table 1.

TABLE 1

| paramCombination | L | $\upsilon \in \{1, 2\}$ | $\upsilon \in \{3, 4\}$ | $\beta$ |
|---|---|---|---|---|
| | | $p_\upsilon$ | | |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

In Rel. 17 (further enhanced Type II port selecting codebook), $$M \in \{1, 2\}, L = \frac{K_1}{2} \text{ where } K_1 = \alpha \times P_{CSIRS},$$

and codebook parameters $(M,\alpha,\beta)$ are configured from Table 2.

TABLE 2

| paramCombination-r17 | M | $\alpha$ | $\beta$ |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾ |

The above-mentioned framework (Eq. 5) represents the precoding-matrices for multiple $(N_3)$ FD units using a linear combination (double sum) over 2L (or $K_1$) SD beams/ports and $M_\upsilon$ FD beams. This framework can also be used to represent the precoding-matrices in time domain (TD) by replacing the FD basis matrix $W_f$ with a TD basis matrix $W_t$, wherein the columns of $W_t$ comprises $M_\upsilon$ TD beams that represent some form of delays or channel tap locations. Hence, a precoder $W^l$ can be described as follows.

$$W=A_l C_l B_t^H = W_1 \tilde{W}_2 W_t^H, \tag{Eq. 5A}$$

In one example, the $M_\upsilon$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

In one example, the codebook for the CSI report is according to at least one of the following examples.

In one example, the codebook can be a Rel. 15 Type I single-panel codebook (cf. 5.2.2.2.1, TS 38.214).

In one example, the codebook can be a Rel. 15 Type I multi-panel codebook (cf. 5.2.2.2.2, TS 38.214).

In one example, the codebook can be a Rel. 15 Type II codebook (cf. 5.2.2.2.3, TS 38.214).

In one example, the codebook can be a Rel. 15 port selection Type II codebook (cf. 5.2.2.2.4, TS 38.214).

In one example, the codebook can be a Rel. 16 enhanced Type II codebook (cf. 5.2.2.2.5, TS 38.214).

In one example, the codebook can be a Rel. 16 enhanced port selection Type II codebook (cf. 5.2.2.2.6, TS 38.214).

In one example, the codebook can be a Rel. 17 further enhanced port selection Type II codebook (cf. 5.2.2.2.7, TS 38.214).

In one example, the codebook is a new codebook for C-JT CSI reporting.

In one example, the new codebook is a decoupled codebook comprising the following components:

Intra-TRP: per TRP Rel. 16/17 Type II codebook components, i.e., SD basis vectors (W1), FD basis vectors (Wf), W2 components (e.g., SCI, indices of NZ coefficients, and amplitude/phase of NZ coefficients).

Inter-TRP: co-amplitude and co-phase for each TRP.

In one example, the new codebook is a joint codebook comprising following components:

Per TRP SD basis vectors (W1),

Single joint FD basis vectors (Wf), and

Single joint W2 components (e.g., SCI, indices of NZ coefficients, and amplitude/phase of NZ coefficients).

Figure 9:
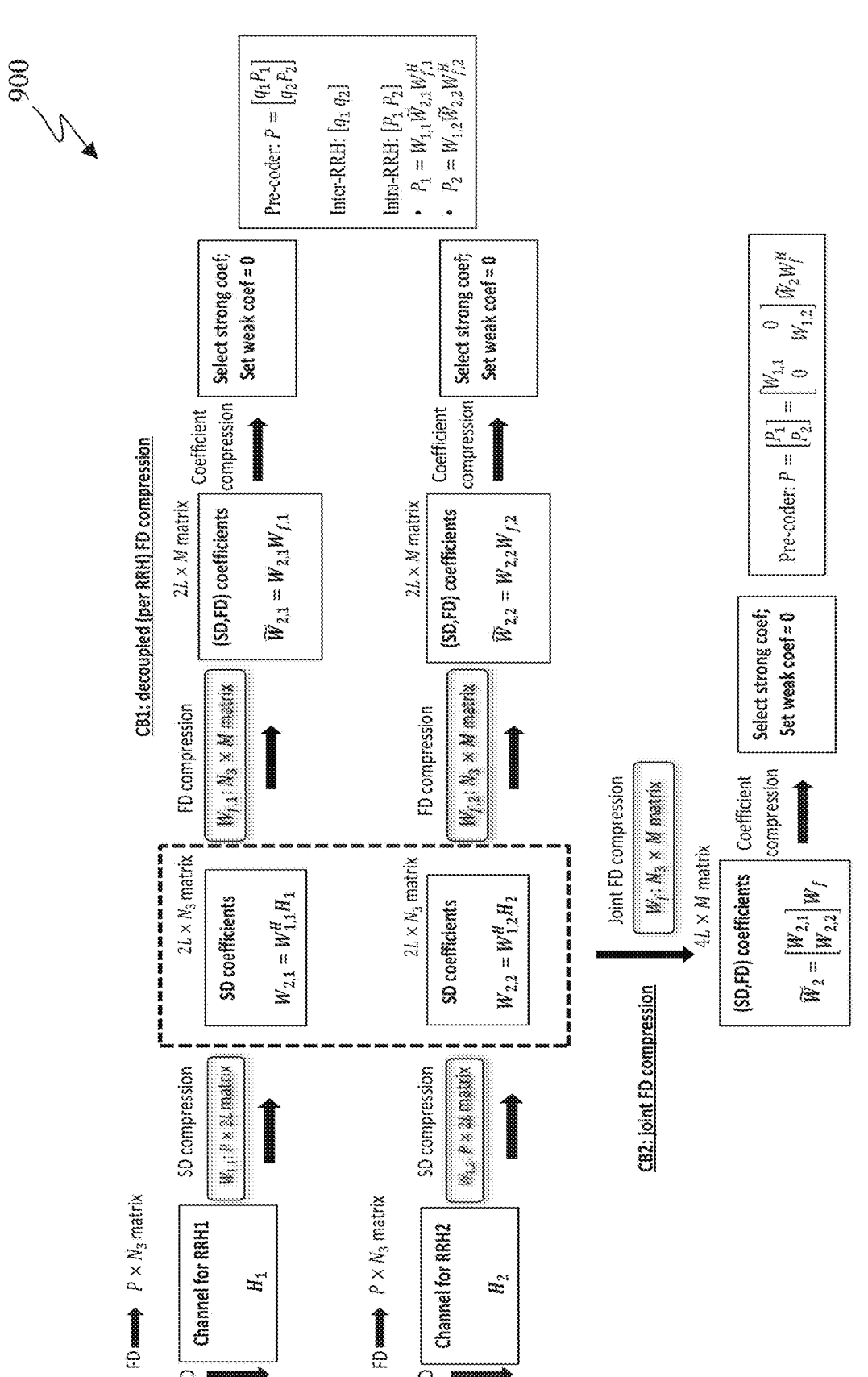
FIG. 9 illustrates two new codebooks according to embodiments of the present disclosure.

FIG. 9 illustrates two new codebooks 900 according to embodiments of the present disclosure. The embodiment of the two new codebooks 900 illustrated in FIG. 9 is for illustration only. FIG. 9 does not limit the scope of this disclosure to any particular implementation of the two new codebooks 900.

In one example, when the codebook is a legacy codebook (e.g., one of Rel. 15/16/17 NR codebooks, according to one of the examples above), then the CSI reporting is based on a CSI resource set comprising one or multiple NZP CSI-RS resource(s), where each NZP CSI-RS resource comprises CSI-RS antenna ports for all TRPs/RRHs, i.e., $P=\Sigma_{r=1}^N P_r$, where P is the total number of antenna ports, and $P_r$ is the number of antenna ports associated with r-th TRP. In this case, a TRP corresponds to (or maps to or is associated with) a group of antenna ports.

In one example, when the codebook is a new codebook (e.g., one of the two new codebooks above), then the CSI reporting is based on a CSI resource set comprising one or multiple NZP CSI-RS resource(s).

In one example, each NZP CSI-RS resource comprises CSI-RS antenna ports for all TRPs/RRHs. i.e., $P=\Sigma_{r=1}^N P_r$, where P is the total number of antenna ports, and $P_r$ is the number of antenna ports associated with r-th TRP. In this case, a TRP corresponds to (or maps to or is associated with) a group of antenna ports.

In one example, each NZP CSI-RS resource corresponds to (or maps to or is associated with) a TRP/RRH.

In one embodiment, a UE is configured with a CSI report (e.g., via higher layer CSI-ReportConfig) based on a codebook for C-JT transmission from multiple TRPs, as described in this disclosure, where the codebook parameters (such as $\alpha$ or L, $\beta$, $p_\upsilon$ or $M_\upsilon$) are configured via a higher-layer parameter 'paramCombination-r18'.

In one example, the Rel. 16 parameter combination table for 'paraCombination-r16' is reused for 'paramCombination-r18' (cf. Table 1).

In one example, the Rel. 17 parameter combination table for 'paraCombination-r17' is reused for 'paramCombination-r18' (cf. Table 2).

In one example, a new table of parameter combination is used for 'paramCombination-r18'.

In one example, a table including existing Rel. 16 or Rel. 17 parameter combination(s) and new parameter combination(s) is used for 'paramCombination-r18'.

In one embodiment, L value configured for TRPs depends on the number of TRPs ($N_{TRP}$).

In one example, L is the same for all TRPs (i.e., TRP-common), and it depends on the number of TRPs (i.e., it can change depending on the value of $N_{TRP}$). For example, L=2, 4, or 6 for 1 TRP ($N_{TRP}$=1),
L=2, 3 for 2 TRPs ($N_{TRP}$=2),
L=1, 2 for 3 TRPs ($N_{TRP}$=3), and
L=1, 2 for 4 TRPs ($N_{TRP}$=4).

In one example, the Rel.16 table of 'paraCombination-r16' is used (or not used), and the L value depends on the number of TRPs ($N_{TRP}$), for example, L for 1 TRP, $$\left\lceil \frac{L}{2} \right\rceil (\text{or } L-1)$$

for 2 TRPs, $$\left\lceil \frac{L}{3} \right\rceil (\text{or } L-2)$$

for 3 TRPs, and $$\left\lceil \frac{L}{4} \right\rceil (\text{or } L-4)$$

for 4 TRPs, where L is the configured value. For example, for the case of 4 TRPs, if L=4 is indicated using the table of 'paraCombination-r16', the actual L value for each TRP is $$\left\lceil \frac{L}{4} \right\rceil = 1.$$

In another example, the Rel. 16 table of 'paraCombination-r16' is used (or not used), and the L value depends on the number of TRPs in a pair-wise manner, for example, L for $$N_{TRP} = 1, 2, \text{ and } \left\lceil \frac{L}{2} \right\rceil \text{ for } N_{TRP} = 3, 4.$$

In another example, the Rel. 16 table of 'paraCombination-r16' is used (or not used), and the L value depends on the number of TRPs, for example, L for $$N_{TRP} = 1, \left\lceil \frac{L}{2} \right\rceil \text{ for } N_{TRP} = 2, \left\lceil \frac{L}{4} \right\rceil \text{ for } N_{TRP} = 3, 4.$$

In one example, L can be different for some or all TRPs.

In one example, the configured L value is applied to a strongest TRP, and L–x (or $\lceil L/y \rceil$) value is applied to the other remaining TRPs, where x or y can be fixed (e.g., x=1, y=2) or configured, or reported by the UE.

In one example, the configured L value is applied to two strongest TRPs, and L–x (or $\lceil L/y \rceil$) value is applied to the other remaining TRPs, where x or y can be fixed (e.g., x=1, y=2) or configured, or reported by the UE.

In another example, $L_{sum} \geq \Sigma L_n$ is configured, where $L_n$ is L value for TRP n. Under the constraint with the configured value of $L_{sum}$, the UE (freely) selects $L_n$ for TRP n. In this example, $L_{sum}$ can be configured using a similar table (or the same table) of 'paraCombination-r16', e.g., replacing L by $L_{sum}$. In one example, $L_{sum}=sL$ where L is the configured value and s is fixed (e.g., 2) or configured. In one example, $L_{sum} \geq N_{TRP}$. In one example, $L_n \geq 1$. In one example, $L_n \geq 0$.

In another example, $L_n$ is configured for each TRP n. In one example, $L_n$ is indicated using the table of 'paraCombination-r16'. In another example, $L_n$ is indicated using a new table of 'paraCombination-r18'.

In another example, $L_1$ is configured for a first group of TRPs, and $L_2$ is configured for a second group of TRPs. In one example, $L_1$ and $L_2$ are indicated using the table of 'paraCombination-r16'. In one example, $L_1$ and $L_2$ are indicated using a new table of 'paraCombination-r18'. In another example, a constraint of $L_2 \leq L_1$ should satisfy when selecting/indicating $L_2$.

In one example, L can be different for some or all TRPs, and it depends on the number of TRPs.

In one example, $L_{sum} \geq \Sigma L_n$ depends on the number of TRPs. For example, $L_{sum}$=2,4,6 for 1 TRP
$L_{sum}$=2,4,6,8 for 2 TRPs
$L_{sum}$=3,4,6,9 for 3 TRPs
$L_{sum}$=4,6,8,12 for 4 TRPs Under the constraint with the configured value of $L_{sum}$, the UE (freely) selects $L_n$ for TRP n. In this example, $L_{sum}$ can be configured using a similar table (or the same table) of 'paraCombination-r16', e.g., replacing L by $L_{sum}$.

In one example, a pair of (L, $N_{TRP}$) can be configured. For example, gNB or NW can indicate one pair among (2,2), (3,2), (4,2), (1,3), (2,3), (3,3), (1,4), and (2,4).

In one example, the UE determines L value for TRPs, e.g., L for strong TRPs, and $$\left\lceil \frac{L}{2} \right\rceil$$

for weak TRPs, and the UE reports strong/weak TRP indices.

In one example, $\alpha$ is the same for all TRPs (i.e., TRP-common), and it depends on the number of TRPs (i.e., it can change depending on the value of $N_{TRP}$). For example,

• $\alpha = \frac{1}{2}, \frac{3}{4}$ or 1 for 1 $TRP(N_{TRP} = 1)$,

• $\alpha = \frac{1}{4}, \frac{1}{2}$ for 3/4 $TRPs(N_{TRP} = 2)$,

• $\alpha = \frac{1}{4}, \frac{1}{2}$ for 3 $TRPs(N_{TRP} = 3)$, and

• $\alpha = \frac{1}{4}, \frac{1}{2}$ for 4 $TRPs(N_{TRP} = 4)$.

In one example, the Rel.17 table of 'paraCombination-r17' is used (or not used), and the $\alpha$ value depends on the number of TRPs ($N_{TRP}$), for example, $\alpha$ for 1 TRP, $$\frac{\alpha}{2}$$

for 2 TRPs, $$\frac{\alpha}{3}$$

for 3 TRPs, and $$\frac{\alpha}{4}$$

for 4 TRPs, where $\alpha$ is the configured value. For example, for the case of 4 TRPs, if $\alpha=1$ is indicated using the table of 'paraCombination-r17', the actual $\alpha$ value for each TRP is $$\frac{\alpha}{4}.$$

In another example, the Rel. 17 table of 'paraCombination-r17' is used (or not used), and the $\alpha$ value depends on the number of TRPs in a pair-wise manner, for example, $\alpha$ for $$N_{TRP} = 1, 2, \text{ and } \frac{\alpha}{2} N_{TRP} = 3, 4.$$

In another example, the Rel. 17 table of 'paraCombination-r17' is used (or not used), and the $\alpha$ value depends on the number of TRPs, for example, $$\alpha \text{ for } N_{TRP} = 1, \frac{\alpha}{2} \text{ for } N_{TRP} = 2, \frac{\alpha}{4} N_{TRP} = 3, 4.$$

In one example, $\alpha$ can be different for some or all TRPs.

In one example, the configured a value is applied to a strongest TRP, and $\alpha/y$ value is applied to the other remaining TRPs, where y can be fixed (e.g., y=2) or configured, or reported by the UE.

In one example, the configured a value is applied to two strongest TRPs, and $\alpha/y$ value is applied to the other remaining TRPs, where y can be fixed (e.g., y=2) or configured, or reported by the UE.

In another example, $\alpha_{sum} \geq \Sigma \alpha_n$ is configured, where $\alpha_n$ is $\alpha$ value for TRP n. Under the constraint with the configured value of $\alpha_{sum}$, the UE (freely) selects $L_n$ corresponding to an for TRP n. In this example, $\alpha_{sum}$ can be configured using a similar table (or the same table) of 'paraCombination-r17', e.g., replacing a by $\alpha_{sum}$. In one example, $\alpha_{sum}=s\alpha$ where $\alpha$ is the configured value and s is fixed (e.g., 2) or configured. In one example, $L_{sum}$ corresponding to $\alpha_{sum}$ is less than or equal to $N_{TRP}$. In one example, $L_n$ corresponding to $\alpha_n$ is less than or equal to 1. In one example, $L_n$ corresponding to $\alpha_n$ is less than or equal to 0.

In another example, an is configured for each TRP n. In one example, $\alpha_n$ is indicated using the Rel-17 table of 'paraCombination-r17'. In another example, $\alpha_n$ is indicated using a new table of 'paraCombination-r18'.

In another example, $\alpha_1$ is configured for a first group of TRPs, and $\alpha_2$ is configured for a second group of TRPs. In one example, $\alpha_1$ and $\alpha_2$ are indicated using the table of 'paraCombination-r17'. In one example, $\alpha_1$ and $\alpha_2$ are indicated using a new table of paraCombination-r18'. In another example, a constraint of $\alpha_2 \leq \alpha_1$ should satisfy when selecting/indicating $\alpha_2$.

In one example, $\alpha$ can be different for some or all TRPs, and it depends on the number of TRPs.

In one example, $\alpha_{sum} \geq \Sigma L_n$, depends on the number of TRPs. For example, $$\alpha_{sum} = \frac{1}{2}, \frac{3}{4}, 1 \text{ for } 1 \text{ TRP},$$

$$\alpha_{sum} = \frac{3}{4}, 1, \frac{3}{2}, 2 \text{ for } 2 \text{ TRPs},$$

$$\alpha_{sum} = 1, \frac{3}{2}, 2, \frac{5}{2} \text{ for } 3 \text{ TRPs, and}$$

$$\alpha_{sum} = 1, \frac{3}{2}, 2, 3 \text{ for } 4 \text{ TRPs}.$$

Under the constraint with the configured value of $\alpha_{sum}$ the UE (freely) selects $L_n$ corresponding to $\alpha_n$ for TRP n. In this example, $\alpha_{sum}$ can be configured using a similar table (or the same table) of 'paraCombination-r17', e.g., replacing a by $\alpha_{sum}$.

In one example, a pair of ($\alpha$, $N_{TRP}$) can be configured. For example, gNB or NW can indicate one pair among ($\frac{1}{2}$,2), ($\frac{3}{4}$,2), (1,2), ($\frac{1}{4}$,3), ($\frac{1}{2}$,3), (1,3), ($\frac{1}{4}$,4), and ($\frac{1}{2}$,4).

In one example, the UE determines a value for TRPs, e.g., $\alpha$ for strong TRPs, and $$\frac{\alpha}{2}$$

for weak TRPs, and the UE reports strong/weak TRP indices.

In embodiment, M value for TRPs depends on the number of TRPs ($N_{TRP}$). p can be configured to indicate M similar to Rel-16, e.g., $$M = \left\lceil p \times \frac{N_3}{R} \right\rceil.$$

M can directly be configured without p value. p value can be rank-dependent (similar to Rel-16). M value is rank-dependent similar to Rel-16, that is $$M_v = \left\lceil p_v \times \frac{N_3}{R} \right\rceil.$$

We drop v index when it is not needed.

In one example, p is the same for all TRPs (i.e., TRP-common), and it depends on the number of TRPs (i.e., it can change depending on the value of $N_{TRP}$). For example, $$p = \frac{1}{8}, \frac{1}{4}, \text{ or } \frac{1}{2} \text{ for } 1 \text{ TRP } (N_{TRP} = 1).$$

-continued $$p = \frac{1}{8}, \frac{1}{4}, \text{ or } \frac{1}{2} \text{ for 2 TRPs } (N_{TRP} = 2),$$

$$p = \frac{1}{16}, \frac{1}{8}, \frac{1}{4} \text{ for 3 TRPs } (N_{TRP} = 3), \text{ and}$$

$$p = \frac{1}{16}, \frac{1}{8}, \frac{1}{4} \text{ for 4 TRPs } (N_{TRP} = 4).$$

In one example, the Rel-16 table of 'paraCombination-r16' is used (or not used), and the p value depends on the number of TRPs, for example, p for 1 TRP, $$\frac{p}{2}$$

for 2 TRPs, $$\frac{p}{3}$$

for 3 TRPs, and $$\frac{p}{4}$$

for 4 TRPs, where p is the configured value. For example, for the case of 4 TRPs, if $$p = \frac{1}{2}$$

is indicated using the table of 'paraCombination-r16', the actual p value for each TRP is $$\frac{p}{4}.$$

In another example, the Rel-16 table of 'paraCombination-r16' is used (or not used), and the p value depends on the number of TRPs in a pair-wise manner, for example, p for $$N_{TRP} = 1, 2, \text{ and } \frac{p}{2} N_{TRP} = 3, 4.$$

In another example, the Rel-16 table of 'paraCombination-r16' is used (or not used), and the p value depends on the number of TRPs, for example, p for $$N_{TRP} = 1, \frac{p}{2} \text{ for } N_{TRP} = 2, \frac{p}{4} \text{ for } N_{TRP} = 3,4.$$

In one example, p can be different for some or all TRPs.

In one example, p value is applied to a strongest TRP, and p/y value is applied to the other remaining TRPs, where e.g., y can be fixed to 2 or 3, or configured, or reported by the UE.

In one example, p value is applied to two strongest TRPs, and p/y value is applied to the other remaining TRPs, where e.g., y can be fixed to 2 or 3, or configured, or reported by the UE.

In another example, let $M_{sum} \geq \Sigma M_n$ and $p_{sum}$ is configured to indicate $$M_{sum} \geq \left\lceil p_{sum} \times \frac{N_3}{R} \right\rceil,$$

where $M_n$ is M value for TRP n. Under the constraint with the configured value of $M_{sum}$, the UE (freely) selects $M_n$ for TRP n. In this example, $p_{sum}$ can be configured using a similar table (or the same table) of 'paraCombination-r16', e.g., replacing p by $p_{sum}$. In one example, $M_{sum}=SM$ where M is the configured value and s is fixed (e.g., 2) or configured. In one example, $M_{sum} \geq N_{TRP}$. In one example, $M_n \geq 1$. In one example, $M_n \geq 0$.

In another example, $p_1$, is configured for each TRP n. In one example, $p_n$ is indicated using the table of 'paraCombination-r16'. In another example, $p_n$ is indicated using a new table of 'paraCombination-r18'.

In another example, $p_1$ is configured for a first group of TRPs, and $p_2$ is configured for a second group of TRPs. In one example, $p_1$ and $p_2$ are indicated using the table of 'paraCombination-r16'. In one example, $p_1$ and $p_2$ are indicated using a new table of 'paraCombination-r18'. In another example, a constraint of $p_2 \leq p_1$ should satisfy when selecting/indicating $p_2$.

In one example, M can be different for some or all TRPs, and it depends on the number of TRPs.

In one example, $M_{sum} \geq \Sigma M_n$ depends on the number of TRPs, and $p_{sum}$ is configured to indicate $$M_{sum} \geq \left\lceil p_{sum} \times \frac{N_3}{R} \right\rceil.$$

For example, $$p_{sum} = \frac{1}{8}, \frac{1}{4}, \text{ or } \frac{1}{2} \text{ for 1 } TRP,$$

$$p_{sum} = \frac{1}{8}, \frac{1}{4}, \text{ or } \frac{1}{2} \text{ for 2 } TRPs,$$

$$p_{sum} = \frac{1}{16}, \frac{1}{8}, \frac{1}{4} \text{ for 3 } TRPs, \text{ and}$$

$$p_{sum} = \frac{1}{16}, \frac{1}{8}, \frac{1}{4} \text{ for 4 } TRPs.$$

Under the constraint with the configured value of $p_{sum}$ (i.e., $M_{sum}$), the UE (freely) selects $M_n$ for TRP n. In this example, $p_{sum}$ can be configured using a similar table (or the same table) of 'paraCombination-r16', e.g., replacing p by $p_{sum}$.

In one example, $p_{sum}$ can be rank-dependent similar to Rel-16 for $p_v$.

In one example, a pair of $(p, N_{TRP})$ can be configured. For example, gNB or NW can indicate one pair among $(\frac{1}{2},2)$, $(\frac{1}{4},2)$, $(\frac{1}{8},2)$, $(\frac{1}{4},3)$, $(\frac{1}{8},3)$, $(\frac{1}{16},3)$, $(\frac{1}{8},4)$, and $(\frac{1}{16},4)$.

In one example, the UE determines M value for TRPs, e.g., M for strong TRPs, and $$\left\lceil \frac{M}{2} \right\rceil$$

for weak and the UE reports strong/weak TRP indices.

In one example, M is the same for all TRPs (i.e., TRP-common), and it depends on the number of TRPs (i.e., it can change depending on the value of $N_{TRP}$). For example, M=1, 2 for 1 TRP ($N_{TRP}$=1), M=1, 2, or 3 for 2 TRPs ($N_{TRP}$=2), M=2, 3, 4 for 3 TRPs ($N_{TRP}$=3), and M=3, 4 for 4 TRPs ($N_{TRP}$=4).

In one example, the Rel-17 table of 'paraCombination-r17' is used (or not used), and the M value depends on the number of TRPs, for example, M for 1 TRP, $$\left\lceil \frac{M}{2} \right\rceil (\text{or } M-1) \text{ for 2 } TRPs, \left\lceil \frac{M}{3} \right\rceil (\text{or } M-2) \text{ for 3 } TRPs, \text{ and}$$

$$\left\lceil \frac{M}{4} \right\rceil (\text{or } M-3)$$

for 4 TRPs, where M is the configured value. For example, for the case of 4 TRPs, if M=2 is indicated using the table of 'paraCombination-r16', the actual M value for each TRP is $$\left\lceil \frac{M}{4} \right\rceil = 1.$$

In another example, the Rel-17 table of 'paraCombination-r17' is used (or not used), and the M value depends on the number of TRPs in a pair-wise manner, for example, M for $$N_{TRP} = 1, 2, \text{ and } \left\lceil \frac{M}{2} \right\rceil \text{ for } N_{TRP} = 3, 4.$$

In another example, the Rel-17 table of 'paraCombination-r17' is used (or not used), and the p value depends on the number of TRPs, for example, M for $$N_{TRP} = 1, \left\lceil \frac{M}{2} \right\rceil \text{ for } N_{TRP} = 2, \left\lceil \frac{M}{4} \right\rceil \text{ for } N_{TRP} = 3, 4.$$

In one example, M can be different for some or all TRPs.

In one example, M value is applied to a strongest TRP, and $\lceil M/y \rceil$ value is applied to the other remaining TRPs, where e.g., y can be fixed to 2 or 3, or configured, or reported by the UE.

In one example, p value is applied to two strongest TRPs, and $\lceil M/y \rceil$ value is applied to the other remaining TRPs, where e.g., y can be fixed to 2 or 3, or configured, or reported by the UE.

In another example, $M_{sum} \geq \Sigma M_n$ is configured, where $M_n$ is M value for TRP n. Under the constraint with the configured value of $M_{sum}$, the UE (freely) selects $M_n$ for TRP n. In this example, $M_{sum}$ can be configured using a similar table (or the same table) of paraCombination-r17', e.g., replacing p by $p_{sum}$. In one example, $M_{sum}$=SM where M is the configured value and s is fixed (e.g., 2) or configured. In one example, $M_{sum} \geq N_{TRP}$. In one example, $M_n \geq 1$. In one example, $M_n \geq 0$.

In another example, $M_n$ is configured for each TRP n. In one example, $M_n$ is indicated using the table (or a similar table) of ' paraCombination-r17'. In another example, $M_n$ is indicated using a new table of 'paraCombination-r18'.

In another example, $M_1$ is configured for a first group of TRPs, and $M_2$ is configured for a second group of TRPs. In one example, $M_1$ and $M_2$ are indicated using the table (or a similar table) of 'paraCombination-r17'. In one example, $M_1$ and $M_2$ are indicated using a new table of 'paraCombination-r18'. In another example, a constraint of $M_2 \leq M_1$ should satisfy when selecting/indicating $M_2$.

In one example, M can be different for some or all TRPs, and it depends on the number of TRPs.

In one example, $M_{sum} \geq \Sigma M_n$ depends on the number of TRPs, For example, $M_{sum}$=1 or 2 for 1 TRP, $M_{sum}$=2 or 3 for 2 TRPs, $M_{sum}$=2,3,4 for 3 TRPs, and $M_{sum}$=3,4,5 for 4 TRPs.

Under the constraint with the configured value of $M_{sum}$, the UE (freely) selects $M_n$ for TRP n. In this example, $M_{sum}$ can be configured using a similar table (or the same table) of ' paraCombination-r17', e.g., replacing M by $M_{sum}$.

In one example, $M_{sum}$ can be rank-dependent similar to Rel-16 for $p_v$.

In one example, a pair of (M, $N_{TRP}$) can be configured. For example, gNB or NW can indicate one pair among (1,2), (2,2), (3,2), (1,3), (2,3), (3,3), (1,4), and (2,4).

In one embodiment, L, M values for TRPs depend on the number of TRPs ($N_{TRP}$). Any combination of L (or $\alpha$) in certain embodiments herein and M (or p) in certain embodiments herein can be applicable to this embodiment.

In one embodiment, (L,p) value configured for TRPs depends on the number of TRPs ($N_{TRP}$).

In one example, (L,p) is the same for all TRPs (i.e., TRP-common), and it depends on the number of TRPs (i.e., it can change depending on the value of $N_{TRP}$).

In one example, the Rel.16 table of ' paraCombination-r16' is used (or not used), and the L and p values depend on the number of TRPs ($N_{TRP}$), for example, L for 1 TRP, $$\left\lceil \frac{L}{2} \right\rceil (\text{or } L-1) \text{ and } \frac{p}{2} \text{ for 2 } TRPs,$$

$$\left\lceil \frac{L}{3} \right\rceil (\text{or } L-2) \text{ and } \frac{p}{3} \text{ for 3 } TRPs, \text{ and}$$

$$\left\lceil \frac{L}{4} \right\rceil (\text{or } L-4) \text{ and } \frac{p}{4} \text{ for 4 } TRPs,$$

where L is the configured value. For example, for the case of 4 TRPs, if L=4, p=½ is indicated using the table of ' paraCombination-r16', the actual L value for each TRP is $$\left\lceil \frac{L}{4} \right\rceil = 1 \text{ and } \frac{p}{4} = \frac{1}{8}.$$

In another example, the Rel. 16 table of 'paraCombination-r16' is used (or not used), and the L and p values depend on the number of TRPs in a pair-wise manner, for example, L and p for $$N_{TRP} = 1, 2, \text{ and } \left\lceil \frac{L}{2} \right\rceil \text{ and } \frac{p}{2} \text{ for } N_{TRP} = 3, 4.$$

In another example, the Rel. 16 table of 'paraCombination-r16' is used (or not used), and the L and p values depend on the number of TRPs, for example, L and p for $$N_{TRP} = 1, \left\lceil \frac{L}{2} \right\rceil \text{ and } \frac{p}{2} \text{ for } N_{TRP} = 2,$$

$$\left\lceil \frac{L}{4} \right\rceil \text{ and } \frac{p}{4} \text{ for } N_{TRP} = 3,4.$$

In one example, L and p can be different for some or all TRPs.

In one example, the configured L and p values are applied to a strongest TRP, and L−x (or $\lceil L/y \rceil$) and $p/y_2$ values are applied to the other remaining TRPs, where x or y and $y_2$ can be fixed (e.g., x=1, y=2, $y_2$=2) or configured, or reported by the UE. In one example, $y=y_2$.

In one example, the configured L and p values are applied to two strongest TRPs, L−x (or $\lceil L/y \rceil$) and $p/y_2$ values are applied to the other remaining TRPs, where x or y and $y_2$ can be fixed (e.g., x=1, y=2, $y_2$=2) or configured, or reported by the UE. In one example, $y=y_2$.

In another example, $L_{sum} \geq \Sigma L_n$, and $p_{sum} \geq \Sigma p_n$, are configured, where $L_n$ is L value for TRP n and $p_n$ is p value for TRP n. Under the constraint with the configured values of $L_{sum}$, and $p_{sum}$ the UE (freely) selects $L_n$ and $M_n$ (corresponding to $p_n$) for TRP n. In this example, $L_{sum}$ and Nun., can be configured using a similar table (or the same table) of 'paraCombination-r16', e.g., replacing L by $L_{sum}$ and p by $p_{sum}$, respectively. In one example, $L_{sum}=sL$ where L is the configured value and s is fixed (e.g., 2) or configured. In one example, $L_{sum} \geq N_{trp}$. In one example, $L_n \geq 1$. In one example, $L_n \geq 0$. In one example, $M_{sum}=s_2M$ where M is the configured value and $s_2$ is fixed (e.g., 2) or configured. In one example, $M_{sum} \geq N_{TRP}$. In one example, $M_n \geq 1$. In one example, $M_n \geq 0$. In one example, $s=s_2$.

In another example, $L_n$ and $p_n$ are configured for each TRP n. In one example, $L_n$ and $p_n$ are indicated using the table of 'paraCombination-r16'. In another example, $L_n$ and $p_n$ are indicated using a new table of 'paraCombination-r18'.

In another example, $L_1$ and $p_1$ are configured for a first group of TRPs, and $L_2$ and $p_2$ configured for a second group of TRPs. In one example, $L_1$ and $L_2$, and $p_1$ and $p_2$ are indicated using the table of 'paraCombination-r16'. In one example, $L_1$ and $L_2$ and $p_1$ and $p_2$ are indicated using a new table of 'paraCombination-r18'. In another example, a constraint of $L_2 \leq L_1$ should satisfy when selecting/indicating $L_2$. In another example, a constraint of $p_2 \leq p_1$ should satisfy when selecting/indicating $p_2$.

In one example, L and p can be different for some or all TRPs, and it depends on the number of TRPs.

In one example, $L_{sum} \geq \Sigma L_n$ and $p_{sum} \geq \Sigma p_n$ depend on the number of TRPs.

Under the constraint with the configured values of $L_{sum}$ and $p_{sum}$, the UE (freely) selects $L_n$ and $p_n$ for TRP n. In this example, $L_{sum}$ and $p_{sum}$ can be configured using a similar table (or the same table) of 'paraCombination-r16', e.g., replacing L by $L_{sum}$, and p by $p_{sum}$, respectively.

In one example, a tuple of (L, p, $N_{TRP}$) can be configured. For example, gNB or NW can indicate one tuple among (2,1/4, 2), (3,1/4,2), (4,1/8,2), (1,1/4,3), (2,1/8,3), (3,1/8,3), (1,1/8,4), and (2,1/8,4).

In one example, the UE determines L and p values for TRPs, e.g., L and p for strong TRPs, and $$\left\lceil \frac{L}{2} \right\rceil \text{ and } \frac{p}{2}$$

for weak TRPs, and the UE reports strong/weak TRP indices.

In one embodiment, a table of 'paraCombination-r18' is designed based on the existing Rel. 16/17 table for 'para-Combination-r16' (Table 1) or 'paraCombination-r17' (Table 2), and the UE can be configured using the table for codebook parameters.

In one example, one value ($C_1$) from the table of 'para-Combination-r16' or 'paraCombination-r17' is configured for a strongest TRP (or two strongest TRPs), and another value ($C_2$) from the table of 'paraCombination-r16' or 'paraCombination-r17' is configured for the remaining TRPs.

In one example, one value ($C_1$) from the table of 'para-Combination-r16' or 'paraCombination-r17' is configured for a strongest TRP (or two strongest TRPs), and another value ($C_2$) from the table of 'paraCombination-r16' or 'paraCombination-r17' is fixed for the remaining TRPs, e.g., $C_2=1$.

In one example, one value ($C_1$) from the table of 'para-Combination-r16' or 'paraCombination-r17' is configured for a strongest TRP (or two strongest TRPs), and another value ($C_2$) from the table of 'paraCombination-r16' or 'paraCombination-r17' is determined based on $C_1$ for the remaining TRPs, in one example $C_2 < C_1$. For example, $C_2=C_1-1$, or max(1, $C_1-1$).

In one example, one value ($C_1$) from the table of 'para-Combination-r16' or 'paraCombination-r17' is configured for a strongest TRP (or two strongest TRPs), and another value ($C_2$) from the table of 'paraCombination-r16' or 'paraCombination-r17' is configured with a restriction based on $C_1$ for the remaining TRPs, e.g., $C_2 \leq C_1$. For example, if $C_1=4$, then $C_2$ is selected from {1,2,3,4}.

The UE can report a strongest TRP index (or indices of 2 or a few strongest TRPs) in the relevant examples above or below.

In one example, Cn from the table of 'paraCombination-r16' or 'paraCombination-r17' is configured for TRP n for n=1, . . . , $N_{TRP}$.

In one example, some restriction on L can be applied to select Cn. For example, a total number of L beams across TRPs (i.e., $L_{sum}$) can be constrained. For example, if $L_{sum}=8$ and $N_{TRP}=3$, ($C_1$, $C_2$, $C_3$)=(1,1,3) can be one possible value.

In one example, some restriction on M(or p) can be applied to select Cn. For example, a total number of M beams across TRPs (i.e., $M_{sum}$ or $p_{sum}$) can be constrained.

In one example, some restriction on M (or p) and L can be applied to select Cn. For example, a total number of M beams across TRPs (i.e., $M_{sum}$ or $p_{sum}$) and a total number of L beams (i.e., $L_{sum}$) can be constrained.

In one example, a table of 'paraCombination-r18' is designed based on a mixed version of the existing tables for 'paraCombination-r16' or 'paraCombination-r17' and a new parameter-combination table, and the UE can be configured using the table for codebook parameters.

In one example, the new table includes combinations with new L value(s). For example, the new L value(s) can include 1 or 3 (or 5). An example is described in Table 3.

In one example, $$p_v = \frac{1}{2}$$

is not included in the table.

Any table including at least one of the combinations provided in the tables in this disclosure can be an example for the table of 'paraCombination-r18'.

TABLE 3

| paramCombination-r18 | L | $p_\upsilon$ $\upsilon \in \{1, 2\}$ | $\upsilon \in \{3, 4\}$ | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |
| 9 | 1 | 1/4 | 1/8 | 1/4 |
| 10 | 1 | 1/4 | 1/8 | 1/2 |
| 11 | 1 | 1/4 | 1/8 | 3/4 |
| 12 | 1 | 1/4 | 1/4 | 1/4 |
| 13 | 1 | 1/4 | 1/4 | 1/2 |
| 14 | 1 | 1/4 | 1/4 | 3/4 |
| 15 | 1 | 1/2 | 1/4 | 1/4 |
| 16 | 1 | 1/2 | 1/4 | 1/2 |
| 17 | 1 | 1/2 | 1/4 | 3/4 |
| 18 | 1 | 1/4 | — | 1/4 |
| 19 | 1 | 1/4 | — | 1/2 |
| 20 | 1 | 1/4 | — | 3/4 |
| 21 | 3 | 1/4 | 1/8 | 1/4 |
| 22 | 3 | 1/4 | 1/8 | 1/2 |
| 23 | 3 | 1/4 | 1/8 | 3/4 |
| 24 | 3 | 1/4 | 1/4 | 1/4 |
| 25 | 3 | 1/4 | 1/4 | 1/2 |
| 26 | 3 | 1/4 | 1/4 | 3/4 |
| 27 | 3 | 1/2 | 1/4 | 1/4 |
| 28 | 3 | 1/2 | 1/4 | 1/2 |
| 29 | 3 | 1/2 | 1/4 | 3/4 |
| 30 | 3 | 1/4 | — | 1/4 |
| 31 | 3 | 1/4 | — | 1/2 |
| 32 | 3 | 1/4 | — | 3/4 |

In one example, the new table includes combinations with new α value(s). For example, the new α value(s) can include 1/4 or 1/8, or 1/16. An example is described in Table 4.

Any table including at least one of the combinations provided in the tables in this disclosure can be an example for the table of 'paraCombination-r18'.

TABLE 4

| paramCombination-r18 | M | α | β |
|---|---|---|---|
| 1 | 1 | 3/4 | 1/2 |
| 2 | 1 | 1 | 1/2 |
| 3 | 1 | 1 | 3/4 |
| 4 | 1 | 1 | 1 |
| 5 | 2 | 1/2 | 1/2 |
| 6 | 2 | 3/4 | 1/2 |
| 7 | 2 | 1 | 1/2 |
| 8 | 2 | 1 | 3/4 |
| 9 | 1 | 1/2 | 1/2 |
| 10 | 1 | 1/2 | 3/4 |
| 11 | 1 | 1/2 | 1 |
| 12 | 1 | 1/4 | 1/2 |
| 13 | 1 | 1/4 | 3/4 |
| 14 | 1 | 1/4 | 1 |
| 15 | 2 | 1/4 | 1/2 |
| 16 | 2 | 1/4 | 3/4 |
| 17 | 1 | 1/8 | 1/2 |
| 18 | 1 | 1/8 | 3/4 |
| 19 | 1 | 1/8 | 1 |
| 20 | 2 | 1/8 | 1/2 |
| 21 | 2 | 1/8 | 3/4 |
| 22 | 1 | 1/16 | 1/2 |
| 23 | 1 | 1/16 | 3/4 |
| 24 | 1 | 1/16 | 1 |

TABLE 4-continued

| paramCombination-r18 | M | α | β |
|---|---|---|---|
| 25 | 2 | 1/16 | 1/2 |
| 26 | 2 | 1/16 | 3/4 |

In one example, the new table includes combinations with new p value(s). For example, the new p value(s) can include 1/6 or 1/10 or 1/16. An example is described in Table 5.

Any table including at least one of the combinations provided in the tables in this disclosure can be an example for the table of 'paraCombination-r18'.

TABLE 5

| paramCombination-r18 | L | $p_\upsilon$ $\upsilon \in \{1, 2\}$ | $\upsilon \in \{3, 4\}$ | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |
| 9 | 2 | 1/6 | 1/8 | 1/4 |
| 10 | 2 | 1/6 | 1/8 | 1/2 |
| 11 | 4 | 1/6 | 1/8 | 1/4 |
| 12 | 4 | 1/6 | 1/8 | 1/2 |
| 13 | 4 | 1/6 | 1/6 | 3/4 |
| 14 | 6 | 1/6 | — | 1/2 |
| 15 | 6 | 1/6 | — | 3/4 |
| 16 | 2 | 1/6 | 1/10 | 1/4 |
| 17 | 2 | 1/6 | 1/10 | 1/2 |
| 18 | 4 | 1/6 | 1/10 | 1/4 |
| 19 | 4 | 1/6 | 1/10 | 1/2 |
| 20 | 2 | 1/6 | 1/16 | 1/4 |
| 21 | 2 | 1/6 | 1/16 | 1/2 |
| 22 | 4 | 1/6 | 1/16 | 1/4 |
| 23 | 4 | 1/6 | 1/16 | 1/2 |
| 24 | 2 | 1/8 | 1/10 | 1/4 |
| 25 | 2 | 1/8 | 1/10 | 1/2 |
| 26 | 4 | 1/8 | 1/10 | 1/4 |
| 27 | 4 | 1/8 | 1/10 | 1/2 |
| 28 | 4 | 1/8 | 1/10 | 3/4 |
| 29 | 6 | 1/8 | — | 1/2 |
| 30 | 6 | 1/8 | — | 3/4 |
| 31 | 2 | 1/8 | 1/16 | 1/4 |
| 32 | 2 | 1/8 | 1/16 | 1/2 |
| 33 | 4 | 1/8 | 1/16 | 1/4 |
| 33 | 4 | 1/8 | 1/16 | 1/2 |
| 34 | 4 | 1/8 | 1/8 | 3/4 |
| 35 | 2 | 1/10 | 1/16 | 1/4 |
| 36 | 2 | 1/10 | 1/16 | 1/2 |
| 37 | 4 | 1/10 | 1/16 | 1/4 |
| 38 | 4 | 1/10 | 1/16 | 1/2 |
| 39 | 4 | 1/10 | 1/10 | 3/4 |
| 40 | 6 | 1/10 | — | 1/2 |
| 41 | 6 | 1/10 | — | 3/4 |

In one example, the new table includes combinations with new L, p value(s). For example, the new L, p value(s) can include (1,1/8) or (1,1/6), (1,1/10), (1,1/16), (3,1/8), (3,1/6), (3,1/10), or (3,16). An example is described in Table 6.

Any table including at least one of the combinations provided in the tables in this disclosure can be an example for the table of 'paraCombination-r18'.

TABLE 6

| paramCombination-r18 | L | $P_\upsilon$ $\upsilon \in \{1, 2\}$ | $\upsilon \in \{3, 4\}$ | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |
| 9 | 1 | 1/6 | 1/8 | 1/4 |
| 10 | 1 | 1/6 | 1/8 | 1/2 |
| 11 | 1 | 1/6 | 1/8 | 3/4 |
| 12 | 1 | 1/6 | 1/6 | 1/4 |
| 13 | 1 | 1/6 | 1/6 | 1/2 |
| 14 | 1 | 1/6 | 1/6 | 3/4 |
| 15 | 1 | 1/6 | — | 1/4 |
| 16 | 1 | 1/6 | — | 1/2 |
| 17 | 1 | 1/6 | — | 3/4 |
| 18 | 1 | 1/6 | 1/10 | 1/4 |
| 19 | 1 | 1/6 | 1/10 | 1/2 |
| 20 | 1 | 1/6 | 1/10 | 3/4 |
| 21 | 1 | 1/6 | 1/16 | 1/4 |
| 22 | 1 | 1/6 | 1/16 | 1/2 |
| 23 | 1 | 1/6 | 1/16 | 3/4 |
| 24 | 3 | 1/6 | 1/8 | 1/4 |
| 25 | 3 | 1/6 | 1/8 | 1/2 |
| 26 | 3 | 1/6 | 1/8 | 3/4 |
| 27 | 3 | 1/6 | 1/6 | 1/4 |
| 28 | 3 | 1/6 | 1/6 | 1/2 |
| 29 | 3 | 1/6 | 1/6 | 3/4 |
| 30 | 3 | 1/6 | — | 1/4 |
| 31 | 3 | 1/6 | — | 1/2 |
| 32 | 3 | 1/6 | — | 3/4 |
| 33 | 3 | 1/6 | 1/10 | 1/4 |
| 34 | 3 | 1/6 | 1/10 | 1/2 |
| 35 | 3 | 1/6 | 1/10 | 3/4 |
| 36 | 3 | 1/6 | 1/16 | 1/4 |
| 37 | 3 | 1/6 | 1/16 | 1/2 |
| 38 | 3 | 1/6 | 1/16 | 3/4 |
| 39 | 1 | 1/8 | 1/8 | 1/4 |
| 40 | 1 | 1/8 | 1/8 | 1/2 |
| 41 | 1 | 1/8 | 1/8 | 3/4 |
| 42 | 1 | 1/8 | — | 1/4 |
| 43 | 1 | 1/8 | — | 1/2 |
| 44 | 1 | 1/8 | — | 3/4 |
| 45 | 1 | 1/8 | 1/10 | 1/4 |
| 46 | 1 | 1/8 | 1/10 | 1/2 |
| 47 | 1 | 1/8 | 1/10 | 3/4 |
| 48 | 1 | 1/8 | 1/16 | 1/4 |
| 49 | 1 | 1/8 | 1/16 | 1/2 |
| 50 | 1 | 1/8 | 1/16 | 3/4 |
| 51 | 3 | 1/8 | 1/8 | 1/4 |
| 52 | 3 | 1/8 | 1/8 | 1/2 |
| 53 | 3 | 1/8 | 1/8 | 3/4 |
| 54 | 3 | 1/8 | — | 1/4 |
| 55 | 3 | 1/8 | — | 1/2 |
| 56 | 3 | 1/8 | — | 3/4 |
| 57 | 3 | 1/8 | 1/10 | 1/4 |
| 58 | 3 | 1/8 | 1/10 | 1/2 |
| 59 | 3 | 1/8 | 1/10 | 3/4 |
| 60 | 3 | 1/8 | 1/16 | 1/4 |
| 61 | 3 | 1/8 | 1/16 | 1/2 |
| 62 | 3 | 1/8 | 1/16 | 3/4 |
| 63 | 1 | 1/10 | — | 1/4 |
| 64 | 1 | 1/10 | — | 1/2 |
| 65 | 1 | 1/10 | — | 3/4 |
| 66 | 1 | 1/10 | 1/10 | 1/4 |
| 67 | 1 | 1/10 | 1/10 | 1/2 |
| 68 | 1 | 1/10 | 1/10 | 3/4 |
| 69 | 1 | 1/10 | 1/16 | 1/4 |
| 70 | 1 | 1/10 | 1/16 | 1/2 |
| 71 | 1 | 1/10 | 1/16 | 3/4 |
| 72 | 3 | 1/10 | — | 1/4 |
| 73 | 3 | 1/10 | — | 1/2 |
| 74 | 3 | 1/10 | — | 3/4 |
| 75 | 3 | 1/10 | 1/10 | 1/4 |
| 76 | 3 | 1/10 | 1/10 | 1/2 |

TABLE 6-continued

| paramCombination-r18 | L | $P_\upsilon$ $\upsilon \in \{1, 2\}$ | $\upsilon \in \{3, 4\}$ | β |
|---|---|---|---|---|
| 77 | 3 | 1/10 | 1/10 | 3/4 |
| 78 | 3 | 1/10 | 1/16 | 1/4 |
| 79 | 3 | 1/10 | 1/16 | 1/2 |
| 80 | 3 | 1/10 | 1/16 | 3/4 |
| 81 | 1 | 1/16 | — | 1/4 |
| 82 | 1 | 1/16 | — | 1/2 |
| 83 | 1 | 1/16 | — | 3/4 |
| 84 | 1 | 1/16 | 1/16 | 1/4 |
| 85 | 1 | 1/16 | 1/16 | 1/2 |
| 86 | 1 | 1/16 | 1/16 | 3/4 |
| 87 | 3 | 1/16 | — | 1/4 |
| 88 | 3 | 1/16 | — | 1/2 |
| 89 | 3 | 1/16 | — | 3/4 |
| 90 | 3 | 1/16 | 1/16 | 1/4 |
| 91 | 3 | 1/16 | 1/16 | 1/2 |
| 92 | 3 | 1/16 | 1/16 | 3/4 |

In one example, the new table includes new L (or a) and M (or p) values.

In one example, the new table includes L (or a) and values. In one example, new values of β such as, 1/5,1/6,1/7, 1/8,1/9,1/10,1/11,1/12,1/13,1/14,1/15,1/16, . . . , 1/32,3/5,3/7,3/8,3/10,3/11,3/13, 3/14,3/16,3/32, . . . , can be included in the table.

In one example, the new table includes M (or p) and values. In one example, new values of such as can 1/5,1/6,1/7, 1/8,1/9,1/10,1/11,1/12,1/13,1/14,1/15,1/16, . . . , 1/32,3/5,3/7,3/8,3/10,3/11,3/13, 3/14,3/16,3/32, . . . , can be included in the table.

In one example, the new table includes L (or α), M (or p), and β values. In one example, new values of β such as 1/5,1/6,1/7,1/8,1/9,1/10,1/11,1/12,1/13,1/14,1/15,1/16, . . . , 1/32,3/5,3/7,3/8, 3/10,3/11,3/13,3/14,3/16,3/32, . . . , can be included in the table.

In one example, the new table includes $\Delta L$ (or $\Delta\alpha$) values.

In one example, the new table includes $\Delta L$ (or $\Delta\alpha$) and $\Delta M$ (or $\Delta p$) values.

In one example, the new table includes $\Delta L$ (or $\Delta\alpha$) and $\Delta\beta$ values.

In one example, the new table includes $\Delta M$ (or $\Delta p$) and $\Delta\beta$ values.

In one example, the new table includes $\Delta L$ (or $\Delta\alpha$), $\Delta M$ (or $\Delta p$), and $\Delta\beta$ values.

Here, the '$\Delta X$' in the new table means a relationship from X value selected/configured using the existing table. In one example, the relationship corresponds to subtraction (e.g., $X_1 - X_2 = \Delta\lambda$, where $X_1$ is a value selected from the existing table, and $X_2$ is a value selected from the new table. Here, e.g., $\Delta X$ could be 0,1,2, . . . and so on). In another example, the relationship corresponds to division, (e.g., $X_2 = \lceil \Delta X \times X_1 \rceil$, where $X_1$ is a value selected from the existing table, and $X_2$ is a value selected from the new table. Here, $$\Delta X = \frac{1}{2}, \frac{1}{3},$$

. . . and so on.)

In one example, the new table includes any combination of the above parameters. For example, the new table includes $\Delta L$, $\Delta M$, and β.

In one example, one value ($C_1$) from the table of 'paraCombination-r16' (Table 1) or 'paraCombination-r17' (Table 2) is configured for a strongest TRP (or two strongest TRPs), and another value ($C_2$) from a new parameter-combination table (e.g., a table including at least one of combinations provided in Tables 3-6) is configured for the remaining TRPs.

In one example, one value ($C_1$) from the table of 'para-Combination-r16' (Table 1) or 'paraCombination-r17' (Table 2) is configured for a strongest TRP (or two strongest TRPs), and another value ($C_2$) from a new parameter-combination table (e.g., a table including at least one of combinations provided in Tables 3-6) is (implicitly) determined based on $C_1$ for the remaining TRPs.

In one example, one value ($C_1$) from the table of 'para-Combination-r16' (Table 1) or 'paraCombination-r17' (Table 2) is configured for a strongest TRP (or two strongest TRPs), and another value ($C_2$) from a new parameter-combination table (e.g., a table including at least one of combinations provided in Tables 3-6) is configured with a restriction based on $C_1$ for the remaining TRPs.

The UE can report a strongest TRP index (or indices of 2 or a few strongest TRPs) in the relevant examples above or below.

In embodiment, a new parameter-combination table of 'paraCombination-r18' is designed, and the UE can be configured using the table for codebook parameters.

In one example, a new parameter-combination table of 'paraCombination-r18' is codebook-common and the number of TRPs-common (i.e., $N_{TRP}$-common). Here the codebook-common means that a same table is used for CB1 and CB2.

In one example, a new parameter-combination table of 'paraCombination-r18' is codebook-specific and $N_{TRP}$-common. For example, as shown in FIG. 9, a new parameter-combination table of 'paraCombination-r18' is specifically designed for CB1 and CB2, respectively.

In one example, a new parameter-combination table of 'paraCombination-r18' is codebook-common and $N_{TRP}$-specific. For example, as shown in FIG. 9, a new parameter-combination table of 'paraCombination-r18' is specifically designed for $N_{TRP}$=2,3,4.

In one example, a new parameter-combination table of 'paraCombination-r18' is codebook-specific and $N_{TRP}$-specific. For example, as shown in FIG. 9, for $N_{TRP}$=2,3,4, a new parameter-combination table of 'paraCombination-r18' is specifically designed for CB1 and CB2, respectively.

In one embodiment, a common table of 'paraCombination-r18' is designed for both Rel-16 Type-II codebook-based mTRP CJT codebook and Type-II port selection codebook-based mTRP CJT codebook. In other words, one common table is used for both the mTRP CJT codebooks design based on Rel-16 Type-II (regular) codebook and Rel-17 Type-II port selection codebook. The UE can be configured using the table for codebook parameters for mTRP CJT codebooks.

In one example, the common table is designed using parameters (L, p, β) (similar to Rel-16 parameter combination). For example, any combination of parameters for L, p, β described in certain embodiments herein can be included in the common table.

In one example, the common table is designed using parameters (M, α, β) (similar to Rel-17 parameter combination). For example, any combination of parameters for M, α, β described in certain embodiments herein can be included in the common table.

In one example, the common table is designed using parameters (L, M, β). For example, any combination of parameters for L, M, β described in certain embodiments herein can be included in the common table.

In one example, the common table is designed using parameters (α, p, β). For example, any combination of parameters for a, p, β described in certain embodiments herein can be included in the common table.

In one example, the common table is designed using a combination of legacy parameters (L, M, α, p, β). and new parameter value(s).

In one embodiment, a UE is configured with an mTRP (or D-MIMO or C-JT) codebook, via e.g., higher layer parameter codebookType set to 'typeII-r18-cjt', which is designed based on Rel-16/17 Type-II codebook. For example, The mTRP codebook has a triple-stage structure which can be represented as $W=W_1 W_2 W_f^H$, where the component $W_1$ is used to report/indicate a spatial-domain (SD) basis matrix comprising SD basis vectors, the component $W_f$ is used to report/indicate a frequency-domain (FD) basis matrix comprising FD basis vectors, and the component $W_2$ is used to report/indicate coefficients corresponding to SD and FD basis vectors.

In one example, in Rel-16 Type-II codebook, L vectors, $v_{m_1^{(i)},m_2^{(i)}}$, i=0, 1, . . . , L−1, are identified by the indices $q_1,q_2,\tilde{n}_1,\tilde{n}_2$, indicated by $i_{1,1}$, $i_{1,2}$, obtained as in 5.2.2.2.3, where the values of C(x,y) are given in Table 5.2.2.2.5-4 of [9].

In Rel-18 Type-II codebook for multi-TRP, $L_n$ SD basis vectors for each TRP n can be selected/reported, where we denote that $L_n$ is a number of SD basis vectors for TRP n (CSI-RS resource n).

In one embodiment, on the SD basis selection for (Rel-18) Type-II codebook refinement for CJT mTRP, each of the $\{L_n, n=1, . . . , N_{TRP}\}$ is configured by NW via higher-layer (RRC) signaling, where $N_{TRP}$ is a number of TRPs configured by the NW.

In one example, $L_n \in \{2,4,6\}$. In one example, $L_n \in \{1,2,4,6\}$. In one example, $L_n \in \{1,2,3,4,5,6\}$. In one example, In one example, $L_n \in \{1,2,3,4\}$. In one example, $L_n \in \{1,2,3\}$. In one example, $L_n \in \{1,2,4\}$. In one example, $L_n$ can be selected from $\mathcal{L}_n$, where $\mathcal{L}_n$ is a subset of $\{1,2,3,4,5,6\}$.

In one embodiment, on the SD basis selection for (Rel-18) Type-II codebook refinement for CJT mTRP, $L_{tot} = \sum_{n=1}^{N_{TRP}} L_n$ is configured by NW via higher-layer (RRC) signaling and the relative value(s) of $\{L_n, n=1, . . . , N_{TRP}\}$ are reported by the UE, where $N_{TRP}$ is a number of TRPs configured by the NW. Although we denote $L_{tot}$ for $\sum_{n=1}^{N_{TRP}} L_n$, another notation can be used for $L_{tot}$, such as $L_{sum}$, L', $\bar{L}$, etc. In one example, $N_{TRP} \in \{1,2,3,4\}$.

In one example, $L_{tot} \in \{2N_{TRP}, 4N_{TRP}, 6N_{TRP}\}$. In one example, $L_{tot} \in \{1N_{TRP}, 2N_{TRP}, 4N_{TRP}, 6N_{TRP}\}$. In one example, $L_{tot} \in \{1N_{TRP}, 2N_{TRP}, 3N_{TRP}, 4N_{TRP}, 5N_{TRP}, 6N_{TRP}\}$. In one example, In one example, $L_{tot} \in \{1N_{TRP}, 2N_{TRP}, 3N_{TRP}, 4N_{TRP}\}$. In one example, $L_{tot} \in \{1N_{TRP}, 2N_{TRP}, 3N_{TRP}\}$.

In one example, $L_{tot} \in \{1N_{TRP}, 2N_{TRP}, 4N_{TRP}\}$. In one example, $L_{tot}$ can be selected from $\mathcal{L}_{tot}$, where $\mathcal{L}_{tot}$ is a subset of $\{1, . . . ,24\}$.

In one example, $L_{tot} \in \mathcal{L}_{tot,1}$ for $N_{TRP} \geq x$ and $L_{tot} \in \mathcal{L}_{tot,2}$ for $N_{TRP} < X$, where $\mathcal{L}_{tot,1}$ and $\mathcal{L}_{tot,2}$ is a subset of $\{1, . . . ,24\}$ and x=1, 2, 3, or 4.

In one example, $L_{tot} \in \mathcal{L}_{tot,1}$ for $N_{TRP} > x$ and $L_{tot} \in \mathcal{L}_{tot,2}$ for $N_{TRP} \leq x$, where $\mathcal{L}_{tot,1}$ and $\mathcal{L}_{tot,2}$ is a subset of $\{1, . . . ,24\}$ and x=1, 2, 3, or 4.

In one example, $\{L_n, n=1, . . . , N_{TRP}\}$ are explicitly reported via a joint indicator or separate multiple indicators in CSI part 1. For example, a joint indicator can be used to indicate $(L_1, . . . , L_{N_{TRP}})$ under the constraint of $L_{tot} = \sum_{n=1}^{N_{TRP}} L_n$ and $L_n \geq 0$, for n=1, . . . , $N_{TRP}$ where $L_n$ is a non-negative integer. In another example, an indicator can be used to indicate each $L_n$ for n=1, . . . , $N_{TRP}$ under the constraint of $L_{tot} = \sum_{n=1}^{N_{TRP}}$ and $L_n \geq 0$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \Sigma_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, $L_n$s associated with TRPs that are selected are explicitly reported via a joint indicator or separate multiple indicators in CSI part 1. In CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. In this example, $L_n$ associated with the selected TRPs are explicitly reported.

In one example, a joint indicator can be used to indicate $\{L_n\}_{n \in s}$ under the constraint of $L_{tot}=\Sigma_{n \in s}L_n$ and $L_n \geq 1$, for $n \in S$ where $L_n$ is a positive integer and S is a set of selected TRP indexes (i.e., a subset of $\{1, 2, \ldots, N_{TRP}\}$.

In one example, a joint indicator can be used to indicate $\{L_n\}_{n=1}^{N}$ under the constraint of $L_{tot}=\Sigma_{n=1}^{N}L_n$ and $L_n \geq 1$, for $n=1, \ldots, N$ where $L_n$ is a positive integer.

In one example, an indicator can be used to indicate each $L_n$ for $n \in S$ under the constraint of $L_{tot}=\Sigma_{n \in s}L_n$ and $L_n \geq 1$ where $L_n$ is a positive integer and S is a set of selected TRP indexes (i.e., a subset of $\{1,2,\ldots, N_{TRP}\}$.

In one example, an indicator can be used to indicate each $L_n$ for $n=1, \ldots, N$ under the constraint of $L_{tot}=\Sigma_{n=1}^{N}L_n$ and $L_n \geq 1$, for $n=1, \ldots, N$ where $L_n$ is a positive integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \Sigma_{n=1}^{N} \binom{N_1 N_2}{L_n} \right\rceil$$

bits or $$\left\lceil \log_2 \Sigma_{n \in S} \binom{N_1 N_2}{L_n} \right\rceil$$

bits.

In one example, $L_n$s associated with TRPs that are selected are explicitly reported via a joint indicator or separate multiple indicators in CSI part 2. The remaining part is similar to other examples described herein.

In one example, some of $\{L_n, n=1, \ldots, N_{TRP}\}$ are explicitly reported via a joint indicator or separate multiple indicators in CSI part 1 and the others of $\{L_n, n=1, \ldots, N_{TRP}\}$ are reported implicitly (or determined implicitly hence not explicitly reported).

In one example, a joint indicator can be used to indicate $(L_1, \ldots, L_{N_{TRP}-1})$, (i.e., excluding L with the highest index), and $L_{N_{TRP}}$ is implicitly determined by $(L_1, \ldots, L_{N_{TRP}-1})$ and $L_{tot}=\Sigma_{n=1}^{N_{TRP}} L_n$ hence $L_{N_{TRP}}$ is not reported. Here, $L_n \geq 0$, for $n=1, \ldots, N_{TRP}-1$ where $L_n$ is a non-negative integer.

In one example, a joint indicator can be used to indicate $(L_2, \ldots, L_{N_{TRP}})$, (i.e., excluding L with the lowest index), and $L_1$ is implicitly determined by $(L_2, \ldots, L_{N_{TRP}})$ and $L_{tot}=\Sigma_{n=1}^{N_{TRP}} L_n$ hence $L_1$ is not reported. Here, $L \geq 0$, for $n=2, \ldots, N_{TRP}$ where $L_n$ is a non-negative integer.

In one example, a joint indicator can be used to indicate $\{L_n\}_{n \in \{1, \ldots, N_{TRP}\} \setminus \{n^*\}}$ (i.e., excluding L with a reference TRP index n*, which can be determined by UE or configured by NW or determined by a predefined rule), and $L_n^*$ is implicitly determined by $\{L_n\}_{n \in \{1, \ldots, N_{TRP}\} \setminus \{n^*\}}$ and $L_{tot}=\Sigma_{n=1}^{N_{TRP}} L_n$ hence $L_{n^*}$ is not reported. Here, $L_n \geq 0$, for $n \in \{1, \ldots, N_{TRP}\} \setminus \{n^*\}$ where $L_n$ is a non-negative integer.

In one example, an indicator can be used to indicate each $L_n$ for $n=1, \ldots, N_{TRP}-1$ (i.e., excluding L with the highest index), and $L_{N_{TRP}}$ is implicitly determined by $L_1, \ldots, L_{N_{TRP}-1}$ and $L_{tot}=\Sigma_{n=1}^{N_{TRP}}$ hence $L_{N_{TRP}}$ is not reported. Here, $L_n \geq 0$, for $n=1, \ldots, N_{TRP}-1$ where $L_n$ is a non-negative integer.

In one example, an indicator can be used to indicate each $L_n$ for $n=2, \ldots, N_{TRP}$ (i.e., excluding L with the lowest index), and $L_1$ is implicitly determined by $L_2, \ldots, L_{N_{TRP}}$ and $L_{tot}=\Sigma_{n=1}^{N_{TRP}} L_n$ hence $L_1$ is not reported. Here, $L_n \geq 0$, for $n=2, \ldots, N_{TRP}$ where $L_n$ is a non-negative integer.

In one example, an indicator can be used to indicate each $L_n$ for $n \in \{1, \ldots, N_{TRP}\} \setminus \{n^*\}$ (i.e., excluding L with a reference TRP index n*, which can be determined by UE or configured by NW or determined by a predefined rule), and $L_{n^*}$ is implicitly determined by $\{Ln\}_{n \in \{1, \ldots, N_{TRP}\} \setminus \{n^*\}}$ and $L_{tot}=\Sigma_{n=1}^{N_{TRP}} L_n$ hence $L_{n^*}$ is not reported. Here, $L_n \geq 0$, for $n \in \{1, \ldots, N_{TRP}\} \setminus \{n^*\}$ where $L_n$ is a non-negative integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate {Ln} SD basis vectors has the payload of $$\left\lceil \log_2 \sum_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, some of $L_n$s associated with TRPs that are selected are explicitly reported via a joint indicator or separate multiple indicators in CSI part 1 and the others of $L_n$s associated with TRPs that are selected are reported implicitly (or determined implicitly hence not explicitly reported). In CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. In this example, some of $L_n$ associated with the selected TRPs are explicitly reported and the others are implicitly determined.

In one example, a joint indicator can be used to indicate $\{L_n\}_{n \in S \setminus \{n_{Low}\}}$ and $L_{n_{Low}}$ is implicitly determined by $\{L_n\}_{n \in S \setminus \{n_{Low}\}}$ and $L_{tot}=\Sigma_{n \in S}L_n$ and $L_n \geq 1$ for $n \in S \setminus \{n_{Low}\}$ where $L_n$ is a positive integer and S is a set of selected TRP indexes (i.e., a subset of $\{1,2, \ldots, N_{TRP}\}$) and $n_{Low}$ is the lowest index in S.

In one example, a joint indicator can be used to indicate $\{L_n\}_{n \in S \setminus \{n_{High}\}}$ and $L_{n_{High}}$ is implicitly determined by $\{L_n\}_{n \in S \setminus \{n_{High}\}}$ and $L_{tot}=\Sigma_{n \in S}L_n$ and $L_n \geq 1$ for $n \in S \setminus \{n_{High}\}$ where $L_n$ is a positive integer and S is a set of selected TRP indexes (i.e., a subset of $\{1,2, \ldots, N_{TRP}\}$) and $n_{High}$ is the highest index in S.

In one example, a joint indicator can be used to indicate $\{Ln\}n \in _{S \setminus \{n*\}}$ and $L_{n*}$ is implicitly determined by $\{L_n\}_{n \in S \setminus \{n*\}}$ and $L_{tot}=\Sigma_{n \in S}L_n$ and $L_n \geq 1$ for $n \in S$ 544 $\{n*\}$ where $L_n$ is a positive integer and S is a set of selected TRP indexes (i.e., a subset of $\{1,2, \ldots, N_{TRP}\}$) and $n*$ is a reference TRP index in S, which can be determined by UE or configured by NW or determined by a pre-defined rule.

In one example, a joint indicator can be used to indicate $\{L_n\}_{n=1}^{N-1}$ and $L_N$ is implicitly determined by $\{L_n\}_{n=1}^{N-1}$ and $L_{tot}=\Sigma_{n=1}^{N}L_n$ and $L_n \geq 1$, for $n=1, \ldots, N-1$ where $L_n$ is a positive integer.

In one example, a joint indicator can be used to indicate $\{L_n\}_{n=2}^{N}$ and $L_1$ is implicitly determined by $\{L_n\}_{n=2}^{N}$ and $L_{tot}=\Sigma_{n=1}^{N}L_n$ and $L_n \geq 1$, for $n=2, \ldots, N$ where $L_n$ is a positive integer.

In one example, a joint indicator can be used to indicate $\{L_n\}_{n \in \{1, \ldots, N\} \setminus \{n*\}}$ and $L_{n*}$ is implicitly determined by $\{L_n\}_{n \in \{1, \ldots, N\} \setminus \{n*\}}$ and $L_{tot}=\Sigma_{n=1}^{N}L_n$ and $L_n \geq 1$, for $n \in \{1, \ldots, N\} \setminus \{n*\}$ where $L_n$ is a positive integer.

In one example, an indicator can be used to indicate each $L_n$ for $n \in S \setminus \{n_{Low}\}$ and $L_{n_{Low}}$ is implicitly determined by $\{L_n\}_{n \in S \setminus \{n_{Low}\}}$ and $L_{tot}=\Sigma_{n \in S}L_n$ and $L_n \geq 1$ for $n \in S \setminus \{n_{Low}\}$ where $L_n$ is a positive integer and S is a set of selected TRP indexes (i.e., a subset of $\{1,2, \ldots, N_{TRP}\}$) and $n_{Low}$ is the lowest index in S.

In one example, an indicator can be used to indicate each $L_n$ for $n \in S \setminus \{n_{High}\}$ and $L_{n_{High}}$ is implicitly determined by $\{L_n\}_{n \in S \setminus \{n_{High}\}}$ and $L_{tot}=\Sigma_{n \in S}L_n$ and $L_n \geq 1$ for $n \in S \setminus \{n_{High}\}$ where $L_n$ is a positive integer and S is a set of selected TRP indexes (i.e., a subset of $\{1,2, \ldots, N_{TRP}\}$) and $n_{High}$ is the highest index in S.

In one example, an indicator can be used to indicate each $L_n$ for $n \in S \setminus \{n*\}$ and $L_{n\{n*\}}$ is implicitly determined by $\{L_n\}_{n \in S \setminus \{n*\}}$ and $L_{tot}=\Sigma_{n \in S}L_n$ and $L_n \geq 1$ for $n \in S \setminus \{n*\}$ where $L_n$ is a positive integer and S is a set of selected TRP indexes (i.e., a subset of $\{1,2, \ldots, N_{TRP}\}$) and $n*$ is a reference TRP index in S, which can be determined by UE or configured by NW or determined by a pre-defined rule.

In one example, an indicator can be used to indicate each $L_n$ for $n=1, \ldots, N-1$ and $L_N$ is implicitly determined by $\{L_n\}_{n=1}^{N-1}$ and $L_{tot}=\Sigma_{n=1}^{N}L_n$ and $L_n \geq 1$, for $n=1, \ldots, N-1$ where $L_n$ is a positive integer.

In one example, an indicator can be used to indicate each $L_n$ for $n=2, \ldots, N$ and $L_1$ is implicitly determined by $\{L_n\}_{n \in \{1, \ldots, N\} \setminus \{n*\}}$ and $L_{tot}=\Sigma_{n=1}^{N}L_n$ and $L_n \geq 1$, for $n \in \{1, \ldots, N\} \setminus \{n*\}$ where $L_n$ is a positive integer.

In one example, an indicator can be used to indicate each $L_n$ for $n \in \{1, \ldots, N\} \setminus \{n*\}$ and $L_{n*}$ is implicitly determined by $\{L_n\}_{n \in \{1, \ldots, N\} \setminus \{n*\}}$ and $L_{tot}=\Sigma_{n=1}^{N}L_n$ and $L_n \geq 1$, for $n \in \{1, \ldots, N\} \setminus \{n*\}$ where $L_n$ is a positive integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \sum_{n=1}^{N} \binom{N_1 N_2}{L_n} \right\rceil$$

bits or $$\left\lceil \log_2 \sum_{n \in S} \binom{N_1 N_2}{L_n} \right\rceil$$

bits.

In one example, some of $L_n$s associated with TRPs that are selected are explicitly reported via a joint indicator or separate multiple indicators in CSI part 2 and the others of $L_n$s associated with TRPs that are selected are reported implicitly (or determined implicitly hence not explicitly reported). The remaining part is similar to other examples described herein.

In one example, $\{L_n, n=1, \ldots, N_{TRP}\}$ are reported implicitly, according to at least one of the following examples.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil$$

bits in CSI part 1. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil$$

bits in CSI part 2. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{N N_1 N_2}{L_{tot}} \right\rceil$$

bits in CSI part 1. In this case, $L_n$ is implicitly determined by counting the number of selected SD basis vectors that belong to the candidate SD basis vectors of each of the selected TRPs.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{N N_1 N_2}{L_{tot}} \right\rceil$$

bits in CSI part 2. In this case, $L_n$ is implicitly determined by counting the number of selected SD basis vectors that belong to the candidate SD basis vectors of each of the selected TRPs.

In one example, for a given $L_{tot}$, a set $\mathcal{L}$ for the value of $L_n$ for $n=1, \ldots, N_{TRP}$ is predetermined and an element of the set is selected and reported. For example, a combination of the elements each of which corresponds to $L_n$ is reported via a joint indicator or separate multiple indicators (that indicate(s) the index of the selected element in the set) in CSI part 1.

In one example, $\mathcal{L}$ is a subset of $\{1,2, \ldots, L_{tot}\}$. In one example, $\mathcal{L}$ is a subset of $\{1, 2, \ldots, 6\}$. For example, $\mathcal{L}=\{1,2,4,6\}$. For example, $\mathcal{L}=\{1,2,3,4\}$. For example, $\mathcal{L}=\{2,4,6\}$. For example, $\mathcal{L}=\{2,3,4\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \sum_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, for a given $L_{tot}$, a set $\mathcal{L}$ for the value of $L_n$ for $n\in S$ or $n=1, \ldots, N$ is predetermined and an index of the set is selected and reported, where S is a set of selected TRPs. (For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected.) In one example, a combination of indexes each of which corresponds to $L_n$ is reported via a joint indicator or separate multiple indicators in CSI part 1.

In one example, $\mathcal{L}$ is a subset of $\{1,2, \ldots, L_{tot}\}$. In one example, $\mathcal{L}$ is a subset of $\{1, 2, \ldots, 6\}$. For example, $\mathcal{L}=\{1,2,4,6\}$. For example, $\mathcal{L}=\{1,2,3,4\}$. For example, $£=\{2,4,6\}$. For example, $£=\{2,3,4\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW, where $n\in S$ or $n=1, \ldots, N$.

In one example, a joint indicator to indicate {Ln} SD basis vectors has the payload of $$\left\lceil \log_2 \sum_{n=1}^{N} \binom{N_1 N_2}{L_n} \right\rceil$$

bits or $$\left\lceil \log_2 \sum_{n \in S} \binom{N_1 N_2}{L_n} \right\rceil$$

bits.

In one example, for a given $L_{tot}$, a set for the value of $L_n$ for $n \in S$ or $n=1, \ldots, N$ is predetermined and an index of the set is selected and reported, where S is a set of selected TRPs. (For example, in CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected.) In one example, a combination of indexes each of which corresponds to $L_n$ is reported via a joint indicator or separate multiple indicators in CSI part 2. The remaining part is similar to or same as other examples described herein.

In one embodiment, on the SD basis selection for (Rel-18) Type-II codebook refinement for CJT mTRP, an L parameter is configured by NW via higher-layer (RRC) signaling and {Ln, n=1, ..., $N_{TRP}$} are determined from the value of L, where $N_{TRP}$ is a number of TRPs configured by the NW. In one example, $N_{TRP} \in \{1,2,3,4\}$.

In one example, one L value is associated with a reference TRP n* and another value determined from L is associated with the remaining $N_{TRP}-1$ (or $N-1$) TRPs. In one example, $$L_{n^*} = L \text{ and } L_n = \left\lceil \frac{L}{2} \right\rceil \text{ for } n \neq n^*.$$

In one example, $$L_{n^*} = L \text{ and } L_n = \left\lceil \frac{L}{x} \right\rceil \text{ for } n \neq n^*,$$

where $x = 2, 3,$ or $4$,

. . . and so on.
   In one example, a reference TRP n* is configured by NW.
   In one example, a reference TRP n* is determined by UE and reported in CSI part 1 or CSI part 2.
   In one example, a reference TRP n* is fixed to 1 or the last index, e.g., $N_{TRP}$ or N, or another value n* $\in \{1, \ldots, N_{TRP}\}$
   In one embodiment, on the SD basis selection for (Rel-18) Type-II codebook refinement for CJT mTRP, $L_{max} \geq \Sigma_{n=1}^{N_{TRP}} L_n$ is configured by NW via higher-layer (RRC) signaling and the relative value(s) of {$L_n$, n=1, ..., $N_{TRP}$} are reported by the UE, where $N_{TRP}$ is a number of TRPs configured by the NW. Although we denote $L_{max}$ for an upper bound of $\Sigma_{n=1}^{N_{TRP}} L_n$, another notation can be used for $L_{max}$, such as $L_{sum}$, L', $\bar{L}$, etc. In one example, $N_{TRP} \in \{1,2,3,4\}$.
   In one example, $L_{max} \in \{2N_{TRP}, 4N_{TRP}, 6N_{TRP}\}$. In one example, $L_{max} \in \{1N_{TRP}, 2N_{TRP}, 4N_{TRP}, 6N_{TRP}\}$.

In one example, $L_{max} \in \{1N_{TRP}, 2N_{TRP}, 3N_{TRP}, 4N_{TRP}, 5N_{TRP}, 6N_{TRP}\}$. In one example, In one example, $L_{max} \in \{1N_{TRP}, 2N_{TRP}, 3N_{TRP}, 4N_{TRP}\}$. In one example, $L_{max} \in \{1N_{TRP}, 2N_{TRP}, 3N_{TRP}\}$.
   In one example, $L_{max} \in \{1N_{TRP}, 2N_{TRP}, 4N_{TRP}\}$. In one example, $L_{max}$ can be selected from $\mathcal{L}_{max}$, where $\mathcal{L}_{max}$ is a subset of $\{1, \ldots, 24\}$.
   In one example, $L_{max} \in \mathcal{L}_{max,1}$ for $N_{TRP} > x$ and $L_{max} \in \mathcal{L}_{max,2}$ for $N_{TRP} \leq x$, where $\mathcal{L}_{max,1}$ and $\mathcal{L}_{max,2}$ is a subset of $\{1, \ldots, 24\}$ and x=1, 2, 3, or 4.
   In one example, $L_{max} \in \mathcal{L}_{max,1}$ for $N_{TRP} > x$ and $L_{max} \in \mathcal{L}_{max,2}$ for $N_{TRP} \leq x$, where $\mathcal{L}_{max,1}$ and $\mathcal{L}_{max,2}$ is a subset of $\{1, \ldots, 24\}$ and x=1, 2, 3, or 4.
   In one example, {$L_n$, n=1, ..., $N_{TRP}$} are explicitly reported via a joint indicator or separate multiple indicators in CSI part 1. For example, a joint indicator can be used to indicate ($L_1, \ldots, L_{N_{TRP}}$) under the constraint of $L_{max} \geq \Sigma_{n=1}^{N_{TRP}} L_n$ and $L_n \geq 0$, for n=1, ..., $N_{TRP}$ where $L_n$ is a non-negative integer. In another example, an indicator can be used to indicate each $L_n$ for n=1, ..., $N_{TRP}$ under the constraint of $L_{max} \geq \Sigma_{n=1}^{N_{TRP}} L_n$ and $L_n \geq 0$. In one example, each $L_n$ is selected from a set $\mathcal{L}$ and indicated via $\lceil \log_2 |\mathcal{L}| \rceil$-bit indicator. So, in this case, $N_{TRP} \lceil \log_2 |\mathcal{L}| \rceil$-bit indicators can be used. In one example, $\mathcal{L} \in \{2,4\}$. In one example, $\mathcal{L} \in \{2,4,6\}$. In one example, $\mathcal{L} \in \{1,2,3,4\}$. In one example, $\mathcal{L} \in \{1,2,3,4,5,6\}$. In one example, $\mathcal{L} \in \{1,2,4\}$. In one example, $\mathcal{L} \in \{1,2,3\}$. In one example, $\mathcal{L}$ is a subset of $\{1,2,3,4,5,6\}$.
   In one example, $L_n$ SD basis vector selection for each TRP n is reported via a joint indicator or separate multiple indicators in CSI part 2.
      In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of ($N_1, N_2$) configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.
      In one example, a joint indicator to indicate {Ln} SD basis vectors has the payload of $$\left\lceil \log_2 \sum_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.
      In one example, $L_n$s associated with TRPs that are selected are explicitly reported via a joint indicator or separate multiple indicators in CSI part 1. In CSI part 1, $N_{TRP}$-bit bitmap is used to indicate selected N TRPs out of $N_{TRP}$ TRPs. For example, when $N_{TRP}=4$ and $N_{TRP}$-bit bitmap is '1001' in CSI part 1, the first TRP and the fourth TRP are selected. In this example, $L_n$ associated with the selected TRPs are explicitly reported.
      In one example, a joint indicator can be used to indicate {$L_n$}$_{n \in s}$ under the constraint of $L_{max} \geq \Sigma_{n \in S} L_n$ and $L_n \geq 1$, for $n \in S$ where $L_n$ is a positive integer and S is a set of selected TRP indexes (i.e., a subset of $\{1,2, \ldots, N_{TRP}\}$.

In one example, a joint indicator can be used to indicate $\{L_n\}_{n=1}^{N}$ under the constraint of $L_{max} \geq \Sigma_{n=1}^{N} L_n$ and $L_n \geq 1$, for $n=1, \ldots, N$ where $L_n$ is a positive integer.

In one example, an indicator can be used to indicate each $L_n$ for $n \in S$ under the constraint of $L_{max} \geq \Sigma_{n \in S} L_n$ and $L_n \geq 1$ where $L_n$ is a positive integer and S is a set of selected TRP indexes (i.e., a subset of $\{1,2, \ldots, N_{TRP}\}$.

In one example, each $L_n$ is selected from a set $\mathcal{L}$ and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2,4\}$. In one example, $\mathcal{L} \in \{2,4,6\}$. In one example, $\mathcal{L} \in \{1,2,3,4\}$. In one example, $\mathcal{L} \in \{1,2,3,4, 5,6\}$. In one example, $\mathcal{L} \in \{1,2,4\}$. In one example, $\mathcal{L} \in \{1,2,3\}$. In one example, $\mathcal{L}$ is a subset of $\{1,2,3, 4,5,6\}$.

In one example, an indicator can be used to indicate each $L_n$ for $n=1, \ldots, N$ under the constraint of $L_{max} \geq \Sigma_{n=1}^{N} L_n$ and $L_n \geq 1$, for $n=1, \ldots, N$ where $L_n$ is a positive integer. In one example, each $L_n$ is selected from a set L and indicated via $\lceil \log_2 |\mathcal{L}| \rceil$-bit indicator. So, in this case, N$\lceil \log_2 |\mathcal{L}| \rceil$-bit indicators can be used. In one example, $\mathcal{L} \in \{2,4\}$. In one example, $\mathcal{L} \in \{2,4,6\}$. In one example, $\mathcal{L} \in \{1,2,3,4\}$. In one example, $\mathcal{L} \in \{1,2,3,4,5,6\}$. In one example, $\mathcal{L} \in \{1,2,4\}$. In one example, $\mathcal{L} \in \{1,2,3\}$. In one example, £ is a subset of 11,2,3,4,5,61.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \sum_{n=1}^{N} \binom{N_1 N_2}{L_n} \right\rceil$$

bits or $$\left\lceil \log_2 \sum_{n \in S} \binom{N_1 N_2}{L_n} \right\rceil$$

bits.

In one example, $L_n$s associated with TRPs that are selected are explicitly reported via a joint indicator or separate multiple indicators in CSI part 2. The remaining part is similar to other examples described herein. For example, when $N_{TRP}=4$ and $N_{TRP}$-bit bitmap is '1001' in CSI part 1, the first TRP and the fourth TRP are selected. In this example, $L_n$ associated with the selected TRPs are explicitly reported.

In one example, a joint indicator can be used to indicate $\{L_n\}_{n \in S}$ under the constraint of $L_{max} \geq \Sigma_{n \in S} L_n$ and $L_n \geq 1$, for $n \in S$ where $L_n$ is a positive integer and S is a set of selected TRP indexes (i.e., a subset of $\{1,2, \ldots, N_{TRP}\}$.

In one example, a joint indicator can be used to indicate $\{L_n\}_{n=1}^{N}$ under the constraint of $L_{max} \geq \Sigma_{n=1}^{N} L_n$ and $L_n \geq 1$, for $n=1, \ldots, N$ where $L_n$ is a positive integer.

In one example, an indicator can be used to indicate each $L_n$ for $n \in S$ under the constraint of $L_{max} \geq \Sigma_{n \in S} L_n$ and $L_n \geq 1$ where $L_n$ is a positive integer and S is a set of selected TRP indexes (i.e., a subset of $\{1,2, \ldots, N_{TRP}\}$. In one example, each $L_n$ is selected from a set $\mathcal{L}$ and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2,4\}$. In one example, $\mathcal{L} \in \{2,4,6\}$. In one example, $\mathcal{L} \in \{1,2,3,4\}$. In one example, $\mathcal{L} \in \{1,2,3,4, 5,6\}$. In one example, $\mathcal{L} \in \{1,2,4\}$. In one example, $\mathcal{L} \in \{1,2,3\}$. In one example, $\mathcal{L}$ is a subset of $\{1,2,3, 4,5,6\}$.

In one example, an indicator can be used to indicate each $L_n$ for $n=1, \ldots, N$ under the constraint of $L_{max} \geq \Sigma_{n=1}^{N} L_n$ and $L_n \geq 1$, for $n=1, \ldots, N$ where $L_n$ is a positive integer. In one example, each $L_n$ is selected from a set $\mathcal{L}$ and indicated via $\lceil \log_2 |\mathcal{L}| \rceil$-bit indicator. So, in this case, N $\lceil \log_2 |\mathcal{L}| \rceil$-bit indicators can be used. In one example, $\mathcal{L} \in \{2,4\}$. In one example, $\mathcal{L} \in \{2,4,6\}$. In one example, $\mathcal{L} \in \{1,2,3,4\}$. In one example, $\mathcal{L} \in \{1, 2,3,4,5,6\}$. In one example, $\mathcal{L} \in \{1,2,4\}$. In one example, $\mathcal{L} \in \{1,2,3\}$. In one example, $\mathcal{L}$ is a subset of $\{1,2,3,4,5,6\}$.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW, where $n \in S$ or $n=1, \ldots, N$.

In one example, a joint indicator to indicate $\{L_n\}$ SD basis vectors has the payload of $$\left\lceil \log_2 \sum_{n=1}^{N} \binom{N_1 N_2}{L_n} \right\rceil$$

bits or $$\left\lceil \log_2 \sum_{n \in S} \binom{N_1 N_2}{L_n} \right\rceil$$

bits.

In one embodiment, $L_{tot}$ is determined by UE where $L_{max} \geq L_{tot} = \Sigma_{n=1}^{N_{TRP}} L_n$ and the determined $L_{tot}$ is reported in CSI part 1. In one example, an indicator to indicate $L_{tot}$ has the size of payload $\lceil \log_2 L_{max} \rceil$ bits, i.e., $L_{tot}$ is selected from $\{1,2,\ldots,L_{max}\}$. In another example, an indicator to indicate $L_{tot}$ has the size of payload $\lceil \log_2 |\mathcal{L}_{tot}| \rceil$ bits, where $\mathcal{L}_{tot}$ is a set including $L_{max}$ and positive integers less than or equal to $L_{max}$, and $|\mathcal{L}_{tot}|$ is a number of the elements in $\mathcal{L}_{tot}$. In one example, $\mathcal{L}_{tot}$ can be any subset of $\{1,2,\ldots,L_{max}\}$. In one example, $\mathcal{L}_{tot}$ can be any subset of $$\left\{ \left\lceil \frac{L_{max}}{4} \right\rceil, \left\lceil \frac{L_{max}}{3} \right\rceil, \left\lceil \frac{L_{max}}{2} \right\rceil, L_{max} \right\}.$$

In one example, $L_{tot} \in \{2N_{TRP}, 4N_{TRP}, 6N_{TRP}\}$. In one example, $L_{tot} \in \{1N_{TRP}, 2N_{TRP}, 4N_{TRP}, 6N_{TRP}\}$. In one example, $L_{tot} \in \{1N_{TRP}, 2N_{TRP}, 3N_{TRP}, 4N_{TRP}, 5N_{TRP}, 6N_{TRP}\}$. In one example, In one example, $L_{tot} \in \{1N_{TRP}, 2N_{TRP}, 3N_{TRP}, 4N_{TRP}\}$. In one example, $L_{tot} \in \{1N_{TRP}, 2N_{TRP}, 3N_{TRP}\}$.

In one example, $L_{tot} \in \{1N_{TRP}, 2N_{TRP}, 4N_{TRP}\}$. In one example, $L_{tot}$ can be selected from a subset of $\{1,\ldots,24\}$.

In one example, $L_{tot} \in \{2N_{TRP}, 4N_{TRP}, 6N_{TRP}\} \cap \{1,2,\ldots,L_{max}\}$. In one example, $L_{tot} \in \{1N_{TRP}, 2N_{TRP}, 4N_{TRP}, 6N_{TRP}\} \cap \{1,2,\ldots,L_{max}\}$. In one example, $L_{tot} \in \{1N_{TRP}, 2N_{TRP}, 3N_{TRP}, 4N_{TRP}, 5N_{TRP}, 6N_{TRP}\} \cap \{1,2,\ldots,L_{max}\}$. In one example, $L_{tot} \in \{1N_{TRP}, 2N_{TRP}, 3N_{TRP}, 4N_{TRP}\} \cap \{1,2,\ldots,L_{max}\}$. In one example, $L_{tot} \in \{1N_{TRP}, 2N_{TRP}, 3N_{TRP}\} \cap \{1,2,\ldots,L_{max}\}$.

In one example, $L_{tot} \in \{1N_{TRP}, 2N_{TRP}, 4N_{TRP}\} \cap \{1,2,\ldots,L_{max}\}$. In one example, $L_{tot}$ can be selected from a subset of $\{1,\ldots,24\} \cap \{1,2,\ldots,L_{max}\}$.

In one example, some of $\{L_n, n=1,\ldots,N_{TRP}\}$ are explicitly reported via a joint indicator or separate multiple indicators in CSI part 1 and the others of $\{L_n, n=1,\ldots,L_{N_{TRP}-1}\}$ are reported implicitly (or determined implicitly hence not explicitly reported).

In one example, a joint indicator can be used to indicate $(L_1,\ldots,L_{N_{TRP}-1})$, (i.e., excluding L with the highest index), and $L_{N_{TRP}}$ is implicitly determined by $(L_1,\ldots,L_{N_{TRP}-1})$ and $L_{tot}=\Sigma_{n=1}^{N_{TRP}} L_n$ hence $L_{N_{TRP}}$ is not reported. Here, $L_n \geq 0$, for $n=1,\ldots,N_{TRP}-1$ where $L_n$ is a non-negative integer.

In one example, a joint indicator can be used to indicate $(L_2,\ldots,L_{N_{TRP}})$, (i.e., excluding L with the lowest index), and $L_1$ is implicitly determined by $(L_2,\ldots,L_{N_{TRP}})$ and $L_{tot}=\Sigma_{n=1}^{N_{TRP}} L_n$ hence $L_1$ is not reported. Here, $L_n \geq 0$, for $n=2,\ldots,N_{TRP}$ where $L_n$ is a non-negative integer.

In one example, a joint indicator can be used to indicate $\{L_n\}_{n \in \{1,\ldots,N_{TRP}\} \backslash \{n^*\}}$ (i.e., excluding L with a reference TRP index $n^*$, which can be determined by UE or configured by NW or determined by a pre-defined rule), and $L_{n^*}$ is implicitly determined by $\{L_n\}_{n \in \{1,\ldots,N_{TRP}\} \backslash \{n^*\}}$ and $L_{tot}=\Sigma_{n=1}^{N_{TRP}} L_n$ hence $L_{n^*}$ is not reported. Here, $L_n \geq 0$, for $n \in \{1,\ldots,N_{TRP}\} \backslash \{n^*\}$ where $L_n$ is a non-negative integer.

In one example, an indicator can be used to indicate each $L_n$ for $n=1,\ldots,N_{TRP}-1$ (i.e., excluding L with the highest index), and $L_{N_{TRP}}$ is implicitly determined by $L_1,\ldots,L_{N_{TRP}-1}$ and $L_{tot}=\Sigma_{n=1}^{N_{TRP}}$ hence $L_{N_{TRP}}$ is not reported. Here, $L_n \geq 0$, for $n=1,\ldots,N_{TRP}-1$ where $L_n$ is a non-negative integer.

In one example, an indicator can be used to indicate each $L_n$ for $n=2,\ldots,N_{TRP}$ (i.e., excluding L with the lowest index), and $L_1$ is implicitly determined by $L_2,\ldots,L_{N_{TRP}}$ and $L_{tot}=\Sigma_{n=1}^{N_{TRP}} L_n$ hence $L_1$ is not reported. Here, $L_n \geq 0$, for $n=2,\ldots,N_{TRP}$ where $L_n$ is a non-negative integer.

In one example, an indicator can be used to indicate each $L_n$ for $n \in \{1,\ldots,N_{TRP}\} \backslash \{n^*\}$ (i.e., excluding L with a reference TRP index $n^*$, which can be determined by UE or configured by NW or determined by a pre-defined rule), and Ln. is implicitly determined by $\{L_n\}_{n \in \{1,\ldots,N_{TRP}\} \backslash \{n^*\}}$ and $L_{tot}=\Sigma_{n=1}^{N_{TRP}} L_n$ hence $L_{n^*}$ is not reported. Here, $L_n \geq 0$, for $n \in \{1,\ldots,N_{TRP}\} \backslash \{n^*\}$ where $L_n$ is a non-negative integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW. For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no payload is induced.

In one example, a joint indicator to indicate $\{L_n\}$ SD basis vectors has the payload of $$\left\lceil \log_2 \sum_{n=1}^{N_{TRP}} \binom{N_1 N_2}{L_n} \right\rceil$$

bits (bit-width). For any TRP n where $L_n=0$ (i.e., no SD beam selection case) and/or where TRP n is not selected which can be indicated via $N_{TRP}$-bit bitmap in CSI part 1, no SD basis vector for TRP n is reported, hence no additional payload is induced in the sum.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil$$

bits in CSI part 1. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across $N_{TRP}$ TRPs and the selection of $L_{tot}$ SD basis vectors is reported via an indicator with size of $$\left\lceil \log_2 \binom{N_{TRP} N_1 N_2}{L_{tot}} \right\rceil$$

bits in CSI part 2. In this case, $L_n$ is implicitly determined by counting the number of selected SD basis vectors that belong to the candidate SD basis vectors of each TRP.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}=4$ and $N_{TRP}$-bit bit-map is '1001' in CSI part 1, the first TRP and the fourth TRP are selected. The selection of $L_{tot}$ SD basis vectors is reported via an indicator with size of $$\left\lceil \log_2 \binom{NN_1 N_2}{L_{tot}} \right\rceil$$

bits in CSI part 1. In this case, $L_n$ is implicitly determined by counting the number of selected SD basis vectors that belong to the candidate SD basis vectors of each of the selected TRPs.

In one example, $L_{tot}$ SD basis vectors are selected among all candidates of SD basis vectors across N TRPs, where N is a number of selected TRPs. For example, in CSI part 1, $N_{TRP}$-bit bitmap is used to indicate selected N TRPs out of $N_{TRP}$ TRPs. For example, when $N_{TRP}$=4 and $N_{TRP}$-bit bitmap is '1001' in CSI part 1, the first TRP and the fourth TRP are selected. The selection of $L_{tot}$ SD basis vectors is reported via an indicator with size of $$\left\lceil \log_2 \binom{NN_1 N_2}{L_{tot}} \right\rceil$$

bits in CSI part 2. In this case, $L_n$ is implicitly determined by counting the number of selected SD basis vectors that belong to the candidate SD basis vectors of each of the selected TRPs.

In one embodiment, $L_{tot}$ is determined by UE where $L_{max} \geq L_{tot} = \Sigma_{n=1}^{N} L_n$ (or $L_{max} \geq L_{tot} = \Sigma_{n \in s} L_n$), and the determined $L_{tot}$ is reported in CSI part 1. Here, N is a number of selected TRPs out of $N_{TRP}$ TRPs and S is a set of selected TRP indexes (i.e., a subset of $\{1,2, \ldots, N_{TRP}\}$). Note that in CSI part 1, $N_{TRP}$-bit bitmap can be used to indicate selected N TRPs out of $N_{TRP}$ TRPs. In one example, an indicator to indicate $L_{tot}$ has the size of payload $\lceil \log_2 L_{max} \rceil$ bits, i.e., $L_{tot}$ is selected from $\{1,2, \ldots, L_{max}\}$. In another example, an indicator to indicate $L_{tot}$ has the size of payload $\lceil \log_2 |\mathcal{L}_{tot}| \rceil$ bits, where $\mathcal{L}_{tot}$ is a set including $L_{max}$ and positive integers less than or equal to $L_{max}$, and $|\mathcal{L}_{tot}|$ is a number of the elements in $\mathcal{L}_{tot}$. In one example, $\mathcal{L}_{tot}$ can be any subset of $\{1,2, \ldots, L_{max}\}$. In one example, $L_{tot}$ can be any subset of $$\left\{ \left\lceil \frac{L_{max}}{4} \right\rceil, \left\lceil \frac{L_{max}}{3} \right\rceil, \left\lceil \frac{L_{max}}{2} \right\rceil, L_{max} \right\}.$$

In one example, an indicator to indicate $L_{tot}$ has the size of payload $$\left\lceil \log_2 \left( L_{max} \cdot \frac{N}{N_{TRP}} \right) \right\rceil \text{ bits,}$$

i.e., $L_{tot}$ is selected from $$\left\{ 1, 2, \ldots, \left\lceil L_{max} \cdot \frac{N}{N_{TRP}} \right\rceil \right\}.$$

In one example, $L_{tot} \in \{2N, 4N, 6N\}$. In one example, $L_{tot} \in \{1N, 2N, 4N, 6N\}$. In one example, $L_{tot} \in \{1N, 2N, 3N, 4N, 5N, 6N\}$. In one example, In one example, $L_{tot} \in \{1N, 2N, 3N, 4N\}$. In one example, $L_{tot} \in \{1N, 2N, 3N, 4N\}$. In one example, $L_{tot} \in \{1N, 2N, 3N\}$.

In one example, $L_{tot} \in \{1N, 2N, 4N\}$. In one example, $L_{tot}$ can be selected from a subset of $\{1, \ldots, 24\}$.

In one example, $L_{tot} \in \{2N, 4N, 6N\} \cap \{1,2, \ldots, L_{max}\}$. In one example, $L_{tot} \in \{1N, 2N, 4N, 6N\} \cap \{1,2, \ldots, L_{max}\}$. In one example, $L_{tot} \in \{1N, 2N, 3N, 4N, 5N, 6N\} \cap \{1,2, \ldots, L_{max}\}$. In one example, In one example, $L_{tot} \in \{1N,2N,3N, 4N\} \cap \{1,2, \ldots, L_{max}\}$. In one example, $L_{tot} \in \{1N, 2N, 3N\} \cap \{1,2, \ldots, L_{max}\}$.

In one example, $L_{tot} \in \{1N, 2N, 4N\} \cap \{1,2, \ldots, L_{max}\}$. In one example, $L_{tot}$ can be selected from a subset of $\{1, \ldots, 24\} \cap \{1, 2, \ldots, L_{max}\}$.

In one example, some of $L_n$s associated with TRPs that are selected are explicitly reported via a joint indicator or separate multiple indicators in CSI part 1 and the others of $L_n$s associated with TRPs that are selected are reported implicitly (or determined implicitly hence not explicitly reported). In CSI part 1, $N_{TRP}$-bit bitmap is used to indicate selected N TRPs out of $N_{TRP}$ TRPs. For example, when $N_{TRP}$=4 and $N_{TRP}$-bit bitmap is '1001' in CSI part 1, the first TRP and the fourth TRP are selected. In this example, some of $L_n$ associated with the selected TRPs are explicitly reported and the others are implicitly determined.

In one example, a joint indicator can be used to indicate $\{Ln\}_{n \in S \setminus \{n_{Low}\}}$ and $L_{n_{Low}}$ is implicitly determined by $\{Ln\}_{n \in S \setminus \{n_{Low}\}}$ and $L_{tot} = \Sigma_{n \in s} L_n$ and $L_n \geq 1$ for $n \in S \setminus \{n_{Low}\}$ where $L_n$ is a positive integer and S is a set of selected TRP indexes (i.e., a subset of $\{1,2, \ldots, N_{TRP}\}$) and $n_{Low}$ is the lowest index in S.

In one example, a joint indicator can be used to indicate $\{L_n\}_{n \in S \setminus \{n_{Low}\}}$ and $L_{n_{High}}$ is implicitly determined by $\{L_n\}_{n \in S \setminus \{n_{High}\}}$ and $L_{tot} = \Sigma_{n \in s} L_n$ and $L_n \geq 1$ for $n \in S \setminus \{n_{High}\}$ where $L_n$ is a positive integer and S is a set of selected TRP indexes (i.e., a subset of $\{1,2, \ldots, N_{TRP}\}$) and $n_{High}$ is the highest index in S.

In one example, a joint indicator can be used to indicate $\{L_n\}_{n \in S \setminus \{n^*\}}$ and $L_{n^*}$ is implicitly determined by $\{L_n\}_{n \in S \setminus \{n^*\}}$ and $L_{tot} = \Sigma_{n \in s} L_n$ and $L_n \geq 1$ for $n \in S \setminus \{n^*\}$ where $L_n$ is a positive integer and S is a set of selected TRP indexes (i.e., a subset of $\{1,2, \ldots, N_{TRP}\}$) and $n^*$ is a reference TRP index in S, which can be determined by UE or configured by NW or determined by a pre-defined rule.

In one example, a joint indicator can be used to indicate $\{L_n\}_{n=1}^{N-1}$ and $L_N$ is implicitly determined by $\{L_n\}_{n=1}^{N-1}$ and $L_{tot} = \Sigma_{n=1}^{N} L_n$ and $L_n \geq 1$, for $n=1, \ldots, N-1$ where $L_n$ is a positive integer.

In one example, a joint indicator can be used to indicate $\{L_n\}_{n=2}^{N}$ and $L_1$ is implicitly determined by $\{Ln\}_{n=2}^{N}$ and $L_{tot} = \Sigma_{n=1}^{N} L_n$ and $L_n \geq 1$, for $n=2, \ldots, N$ where $L_n$ is a positive integer.

In one example, a joint indicator can be used to indicate $\{L_n\}_{n \in \{1, \ldots, N\} \vee \{n^*\}}$ and $L_{n^*}$ is implicitly determined by $\{L_n\}_{n \in \{1, \ldots, N\} \vee \{n^*\}}$ and $L_{tot} = \Sigma_{n=1}^{N} L_n$ and $L_n \geq 1$, for $n \in \{1, \ldots, N\} \setminus \{n^*\}$ where $L_n$ is a positive integer.

In one example, an indicator can be used to indicate each $L_n$ for $n \in S \setminus \{n_{Low}\}$ and $L_{n_{Low}}$ is implicitly determined by $\{L_n\}_{n \in S \setminus \{n_{Low}\}}$ and $L_{tot} = \Sigma_{n \in S} L_n$ and $L_n \geq 1$ for $n \in S \setminus \{n_{Low}\}$ where $L_n$ is a positive integer and S is a set of selected TRP indexes (i.e., a subset of $\{1,2, \ldots, N_{TRP}\}$) and $n_{Low}$ is the lowest index in S.

In one example, an indicator can be used to indicate each $L_n$ for $n \in S \setminus \{n_{High}\}$ and $L_{n_{High}}$ is implicitly determined by $\{Ln\}_{n \in S \setminus \{n_{High}\}}$ and $L_{tot} = \Sigma_{n \in S} L_n$ and $L_n \geq 1$ for $n \in S \setminus \{n_{High}\}$ where $L_n$ is a positive integer and S is a set of selected TRP indexes (i.e., a subset of $\{1,2, \ldots, N_{TRP}\}$) and $n_{High}$ is the highest index in S.

In one example, an indicator can be used to indicate each $L_n$ for $n \in S\backslash\{n^*\}$ and $L_{n_{\{n^*\}}}$ is implicitly determined by $\{Ln\}_{n \in S \backslash \{n^*\}}$ and $L_{tot} = \Sigma_{n \in S} L_n$ and $L_n \geq 1$ for $n \in S\backslash\{n^*\}$ where $L_n$ is a positive integer and S is a set of selected TRP indexes (i.e., a subset of $\{1,2,\ldots,N_{TRP}\}$) and $n^*$ is a reference TRP index in S, which can be determined by UE or configured by NW or determined by a pre-defined rule.

In one example, an indicator can be used to indicate each $L_n$ for $n=1, \ldots, N-1$ and $L_N$ is implicitly determined by $\{L_n\}_{n=1}^{N-1}$ and $L_{tot} = \Sigma_{n=1}^{N} L_n$ and $L_n \geq 1$, for $n=1, \ldots, N-1$ where $L_n$ is a positive integer.

In one example, an indicator can be used to indicate each $L_n$ for $n=2, \ldots, N$ and $L_1$ is implicitly determined by $\{L_n\}_{n=2}^{N}$ and $L_{tot} = \Sigma_{n=1}^{N} L_n$ and $L_n \geq 1$, for $n=1, \ldots, N-1$ where $L_n$ is a positive integer.

In one example, an indicator can be used to indicate each $L_n$ for $n \in \{1, \ldots, N\}\backslash\{n^*\}$ and $L_{n^*}$ is implicitly determined by $\{L_n\}_{n \in \{1, \ldots, N\}\backslash\{n^*\}}$ and $L_{tot} = \Sigma_{n=1}^{N} L_n$ and $L_n \geq 1$, for $n \in \{1, \ldots, N\} \backslash \{n^*\}$ where $L_n$ is a positive integer.

In one example, $L_n$ SD basis vector selection for each TRP n is reported via a joint indicator or separate multiple indicators in CSI part 2.

In one example, an indicator to indicate (each) $L_n$ SD basis vectors has the payload of $$\left\lceil \log_2 \binom{N_1 N_2}{L_n} \right\rceil$$

bits (bit-width), where $N_1$ and $N_2$ are the values of $(N_1, N_2)$ configured via higher-layer (RRC) signaling by the NW, where $n \in S$ or $n=1, \ldots, N$.

In one example, a joint indicator to indicate $\{Ln\}$ SD basis vectors has the payload of $$\left\lceil \log_2 \sum_{n=1}^{N} \binom{N_1 N_2}{L_n} \right\rceil$$

bits or $$\left\lceil \log_2 \sum_{n \in S} \binom{N_1 N_2}{L_n} \right\rceil$$

bits.

In one example, some of $L_n$s associated with TRPs that are selected are explicitly reported via a joint indicator or separate multiple indicators in CSI part 2 and the others of $L_n$s associated with TRPs that are selected are reported implicitly (or determined implicitly hence not explicitly reported). The remaining part is similar to other examples described herein.

In one example, $L_{tot}$ SD basis vectors are selected among all candidates of SD basis vectors across N TRPs. The selection of $L_{tot}$ SD basis vectors is reported via an indicator with size of $$\left\lceil \log_2 \binom{NN_1 N_2}{L_{tot}} \right\rceil$$

bits in CSI part 1. In this case, $L_n$ is implicitly determined by counting the number of selected SD basis vectors that belong to the candidate SD basis vectors of each of the selected TRPs.

In one example, $L_{tot}$ SD basis vectors are selected among all candidates of SD basis vectors across N TRPs. The selection of $L_{tot}$ SD basis vectors is reported via an indicator with size of $$\left\lceil \log_2 \binom{NN_1 N_2}{L_{tot}} \right\rceil$$

bits in CSI part 2. In this case, $L_n$ is implicitly determined by counting the number of selected SD basis vectors that belong to the candidate SD basis vectors of each of the selected TRPs.

In one embodiment, a bitmap with size of $NN_1N_2$ is used to indicate SD basis vectors for selected N TRPs (CSI-RS resources) in CSI part 2. For example, in the bitmap, '0' refers 'not selected' for corresponding SD vector and '1' refers 'selected' for corresponding SD vector. In this case, $L_n$ can be inferred from the bitmap, by counting the number of selected SD vectors corresponding to each TRP. In this case, a restriction can be described such as "UE shall not report a CSI with $L_{tot} = \Sigma_n L_n > L_{max}$, where $L_n$ is inferred from the bitmap".

In one embodiment, any combination or some of certain embodiments described herein can be configured by NW via higher-layer (RRC) signalling. In one example, any combination or some of examples in embodiments described herein can be configured by NW via higher-layer RRC signalling.

In one embodiment, in all embodiments/examples under a certain embodiment described herein, $L_n$, $L_{tot}$, $L_{max}$ can be replaced by $\alpha_n$, $\alpha_{tot}$, $\alpha_{max}$, where $$\alpha_n = \frac{L_n}{N_1 N_2}, \alpha_{tot} = \frac{L_{tot}}{N_{TRP}N_1 N_2} \text{(or } \alpha_{tot} = \frac{L_{tot}}{NN_1 N_2}\text{), and}$$

$$\alpha_{max} = \frac{L_{max}}{N_{TRP}N_1 N_2} \text{(or } \alpha_{max} = \frac{L_{max}}{NN_1 N_2}\text{).}$$

Figure 10:
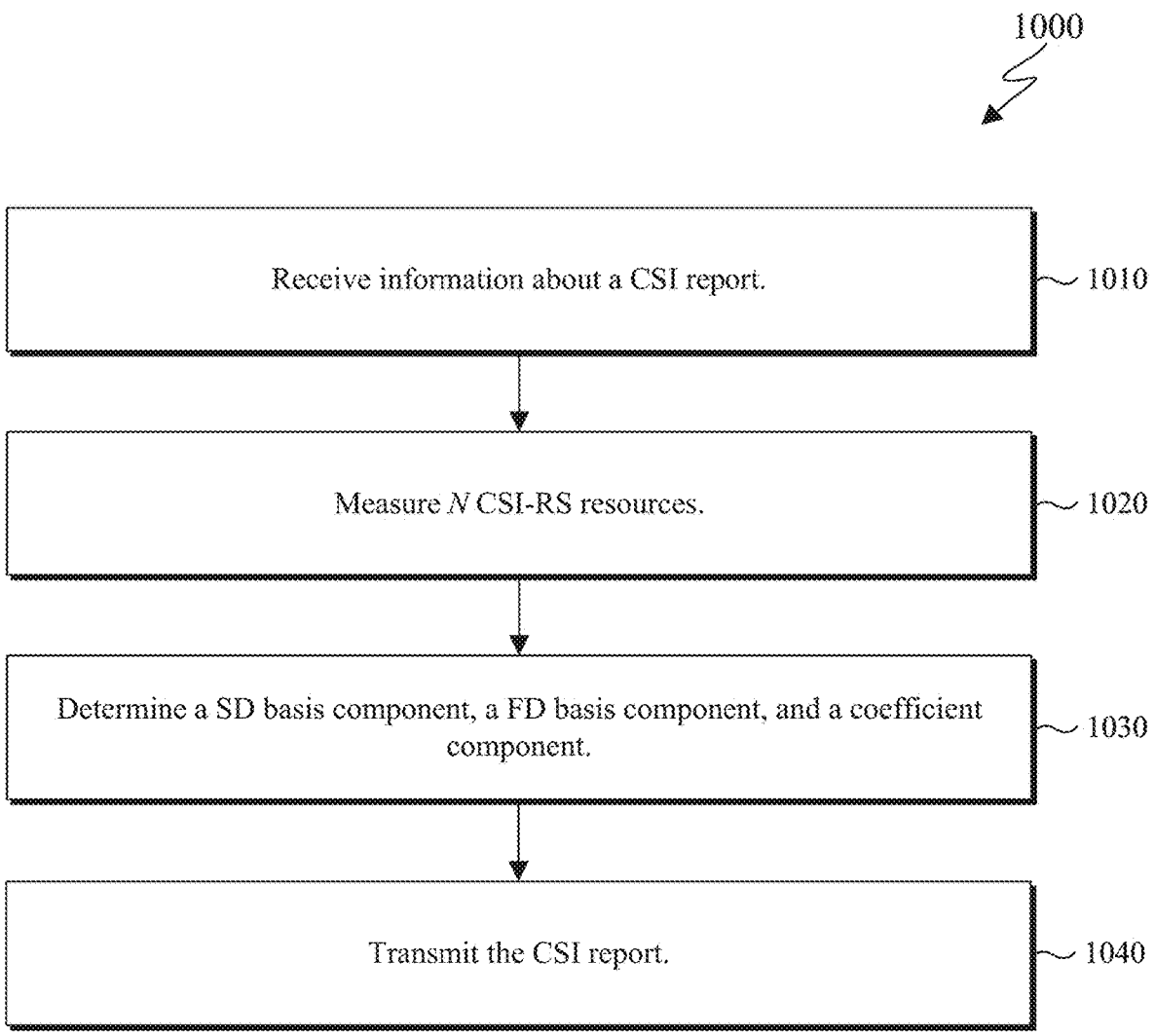
FIG. 10 illustrates an example method performed by a UE in a wireless communication system according to embodiments of the present disclosure.

FIG. 10 illustrates an example method 1000 performed by a UE in a wireless communication system according to embodiments of the present disclosure. The method 1000 of FIG. 10 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1000 is for illustration only and other embodiments can be used without departing from the scope of the present disclosure.

The method 1000 begins with the UE receiving information about a CSI report (1010). For example, in 1010, the information can indicate N>1 CSI-RS resources, a codebook, and codebook parameters. In this example, the codebook includes a SD basis component, a FD basis component, and a coefficient component. The SD basis component includes $L_r$ basis vectors for each CSI-RS resource $r=1, \ldots, N$. The FD basis component includes $M_v$ basis vectors. The coefficient component includes coefficients associated with (SD, FD) basis vector pairs. The codebook parameters include $$p_v = \begin{cases} \dfrac{1}{8} & \text{for } v = 1, 2 \\ \dfrac{1}{16} & \text{for } v = 3, 4 \end{cases}, (L_1, L_2, \dots, L_N),$$

and $\beta$ where $p_v$ is a parameter to determine a value of $M_v$, based on a total number of precoding matrices $N_3$, v is a number of layers, and $\beta \leq 1$ is a parameter to determine an upper bound $K_0$ of a number of non-zero coefficients of the coefficient component.

In various embodiments, when $$N = 2, \beta = \frac{1}{4} \text{ and } (L_1, L_2) = (2, 2),$$

$$(L_1, L_2) = *2,4), \text{ or } (L_1, L_2) = (4, 2).$$

In another embodiment, when $$N = 2, \beta = \frac{1}{2} \text{ and } (L_1, L_2) = (4, 4).$$

In various embodiments, when $$N = 3, \beta = \frac{1}{4} \text{ or } \frac{1}{2} \text{ and } (L_1, L_2, L_3) = (2, 2, 2),$$

$$(L_1, L_2, L_3) = (2, 2, 4), (L_1, L_2, L_3) = (2, 4, 2),$$

$$(L_1, L_2, L_3) = (4, 2, 2), \text{ or } (L_1, L_2, L_3) = (4, 4, 4).$$

In various embodiments, when $$N = 4, \beta = \frac{1}{4} \text{ and } (L_1, L_2, L_3, L_4) = (2, 2, 2, 2),$$

$$\text{or } (L_1, L_2, L_3, L_4) = (2, 2, 2, 4).$$

In another embodiment, when $$N = 4, \beta = \frac{1}{2} \text{ and } (L_1, L_2, L_3, L_4) = (4, 4, 4, 4).$$

The UE then measures the N CSI-RS resources (1020). For example, in 1020, the measurement is based on the information received about the CSI report. The UE then determines the SD basis component, the FD basis component, and the coefficient component (1030). For example, in 1030, the determination may be based on the codebook parameters and information received about the CSI report. In various embodiments, the codebook parameters further include $L_{max}$, where $L_{max} \geq \sum_{r=1}^{N} L_r$. In one example, the UE further determines $L_r$ for r=1, 2, . . . , N under a constraint of $L_{max} \geq \sum_{r=1}^{N} L_r$, and the CSI report further includes an indicator indicating $L_r$ for r=1, 2, . . . , N.

The UE then transmits the CSI report (1040). For example, in 1040, the CSI report may include or indicate the determined SD basis component, the FD basis component, and the coefficient component.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompasses such changes and modifications as falls within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:
   a transceiver configured to receive, via higher layer signaling, first configuration information on a channel state information (CSI) report and second configuration information on $N_{TRP} > 1$ CSI reference signal (CSI-RS) resources, wherein the first configuration information includes codebook configuration information, and wherein the codebook configuration information includes codebook type information indicating a Type II coherent joint transmission (CJT) codebook; and
   a processor operably coupled to the transceiver, the processor configured to:
      determine codebook parameters for the Type II CJT codebook based on the codebook configuration information, wherein the codebook parameters include:

$$p_v = \begin{cases} \dfrac{1}{8} & \text{for } v = 1, 2 \\ \dfrac{1}{16} & \text{for } v = 3, 4 \end{cases}, (L_1, L_2, \dots, L_N),$$

and $\beta$ where:
      $p_v$ is a codebook parameter associated with $M_v$ vectors,
      v is a number of layers, and
      $\beta$ is a parameter associated with a number of non-zero coefficients; and
   determine the CSI report based on $L_r$ vectors, $M_v$ vectors, and the non-zero coefficients for the Type II CJT codebook, wherein r=1, . . . , $N_{TRP}$ AND $L_r$ corresponds to a CSI-RS resource among the $N_{TRP}$ CSI-RS resources,
wherein the transceiver is further configured to transmit the CSI report.

2. The UE of claim 1, wherein, when $$N = 2, \beta = \frac{1}{4} \text{ and}$$

$$(L_1, L_2) = (2, 2),$$

$$(L_1, L_2) = (2, 4), \text{ or}$$

$$(L_1, L_2) = (4, 2).$$

3. The UE of claim 1, wherein the $N_{TRP}$ CSI-RS resources correspond to $N_{TRP}$ transmission and reception points (TRPs) associaed with the Type II CJT codebook.

4. The UE of claim 1, wherein, when $$N = 3, \beta = \frac{1}{4} \text{ or } \frac{1}{2} \text{ and}$$

$$(L_1, L_2, L_3) = (2, 2, 2),$$

$$(L_1, L_2, L_3) = (2, 2, 4),$$

$$(L_1, L_2, L_3) = (2, 4, 2),$$

$$(L_1, L_2, L_3) = (4, 2, 2), \text{ or}$$

$$(L_1, L_2, L_3) = (4, 4, 4).$$

5. The UE of claim 1, wherein, when $$N = 4, \beta = \frac{1}{4} \text{ and}$$

$$(L_1, L_2, L_3, L_4) = (2, 2, 2, 2), \text{ or}$$

$$(L_1, L_2, L_3, L_4) = (2, 2, 2, 4).$$

6. The UE of claim 1, wherein, when $$N = 4, \beta = \frac{1}{2} \text{ and } (L_1, L_2, L_3, L_4) = (4, 4, 4, 4).$$

7. The UE of claim 1, wherein:
$L_r$ vectors are spatial domain, SD, basis vectors of SD basis component for the Type II CJT codebook, and
the My vectors are frequency domain, FD, basis vectors of FD basis component for the Type II CJT codebook.

8. The UE of claim 1, wherein:
the codebook parameters further include $L_{max}$, where $L_{max} \geq \sum_{r=1}^{N^{TRP}} L_r$,
the processor is further configured to determine $L_r$ for r=1, 2, . . . , $N_{TRP}$ under a constraint of $L_{max} \geq \sum_{r=1}^{N} L_r$, and
the CSI report further includes an indicator indicating $L_r$ for r=1, 2, . . . , $N_{TRP}$.

9. A base station (BS) comprising:
transceiver configured to:
    transmit, via higher layer signaling, first configuration information on a channel state information (CSI) report and second configuration information on $N_{TRP} > 1$ CSI reference signal (CSI-RS) resources, wherein:
    the first configuration information includes codebook configuration information and
    the codebook configuration information includes codebook type information indicating a Type II coherent joint transmission (CJT) codebook, codebook parameters for the Type II CJT codebook are based on the codebook configuration information, and
the codebook parameters include:

$$p_v = \begin{cases} \frac{1}{8} & \text{for } v = 1, 2 \\ \frac{1}{16} & \text{for } v = 3, 4 \end{cases}, (L_1, L_2, \ldots, L_N),$$

and β where:
    $p_v$ is a codebook parameter associated with $M_v$ vectors,
    V is a number of layers, and
    β is a parameter associated with a number of non-zero coefficients; and
receive the CSI report; and
a processor operably coupled to the transceiver, the processor configured to determine, based on the CSI report, $L_r$, vectors, the $M_v$ vectors and the non-zero coefficients for the Type II CJT codebook, wherein r =1, . . . , $N_{TRP}$ and L, corresponds to a CSI-RS resource among the $N_{TRP}$ CSI-RS resources.

10. The BS of claim 9, wherein, when $$N = 2, \beta = \frac{1}{4} \text{ and}$$

$$(L_1, L_2) = (2, 2),$$

$$(L_1, L_2) = (2, 4), \text{ or}$$

$$(L_1, L_2) = (4, 2).$$

11. The BS of claim 9, wherein the $N_{TRP}$ CSI-RS resources correspond to $N_{TRP}$ transmission and reception points (TRPs) associated with the Type II CJT codebook.

12. The BS of claim 9, wherein, when $$N = 3, \beta = \frac{1}{4} \text{ or } \frac{1}{2} \text{ and}$$

$$(L_1, L_2, L_3) = (2, 2, 2),$$

$$(L_1, L_2, L_3) = (2, 2, 4),$$

$$(L_1, L_2, L_3) = (2, 4, 2),$$

$$(L_1, L_2, L_3) = (4, 2, 2), \text{ or}$$

$$(L_1, L_2, L_3) = (4, 4, 4).$$

13. The BS of claim 9, wherein, when $$N = 4, \beta = \frac{1}{4} \text{ and}$$

$$(L_1, L_2, L_3, L_4) = (2, 2, 2, 2), \text{ or}$$

$$(L_1, L_2, L_3, L_4) = (2, 2, 2, 4).$$

14. The BS of claim 9, wherein, when $$N = 4, \beta = \frac{1}{2} \text{ and } (L_1, L_2, L_3, L_4) = (4, 4, 4, 4).$$

15. The BS of claim 9, wherein:

$L_r$ vectors are spatial domain, SD, basis vectors of SD basis component for the Type II CJT codebook, and the My vectors are frequency domain, FD, basis vectors of FD basis component for the Type II CJT codebook.

16. The BS of claim 15, wherein:

the codebook parameters further include $L_{max}$, where $L_{max} \geq \sum_{r=1}^{N^{TRP}} L_r$, $L_r$ for r=1, 2, . . . , $N_{TRP}$ is under a constraint of $L_{max} \geq \sum_{r=1}^{N} L_r$, and the CSI report further includes an indicator indicating $L_r$ for r=1, 2, . . . , N.

17. A method performed by a user equipment (UE), the method comprising:

receiving, via higher layer signaling, first configuration information on a channel state information (CSI) report and second configuration information on $N_{TRP}>1$ CSI reference signal (CSI-RS) resources, wherein the first configuration information includes codebook configuration information, and wherein the codebook configuration information includes codebook type information indicating a Type II coherent joint transmission (CJT) codebook;

determining codebook parameters for the Type II CJT codebook based on the codebook configuration information, wherein the codebook parameters include:

$$p_v = \begin{cases} \dfrac{1}{8} & \text{for } v = 1, 2 \\ \dfrac{1}{16} & \text{for } v = 3, 4 \end{cases}, (L_1, L_2, \ldots, L_N),$$

and β where:

$p_v$ is a codebook parameter associated with $M_v$ vectors, v is a number of layers, and β is a parameter associated with a number of non-zero coefficients of the coefficient;

determining the CSI report based on $L_r$ vectors, the $M_v$ vectors, and the non-zero coefficients for the Type II CJT codebook, wherein r=1, . . . , $N_{TRP}$ and $L_r$ corresponds to a CSI-RS resource among the $N_{TRP}$ CSI-RS resources; and transmitting the CSI report.

18. The method of claim 17, wherein, when $$N = 2, \beta = \frac{1}{4} \text{ and}$$

$$(L_1, L_2) = (2, 2),$$

$$(L_1, L_2) = (2, 4), \text{ or}$$

$$(L_1, L_2) = (4, 2).$$

19. The method of claim 17, wherein the $N_{TRP}$ CSI-RS resources correspond to $N_{TRP}$ transmission and reception points (TRPs) associated with the Type II CJT codebook.

20. The method of claim 17, wherein, when $$N = 3, \beta = \frac{1}{4} \text{ or } \frac{1}{2} \text{ and}$$

$$(L_1, L_2, L_3) = (2, 2, 2),$$

$$(L_1, L_2, L_3) = (2, 2, 4),$$

$$(L_1, L_2, L_3) = (2, 4, 2),$$

$$(L_1, L_2, L_3) = (4, 2, 2), \text{ or}$$

$$(L_1, L_2, L_3) = (4, 4, 4).$$

* * * * *